United States Patent
Yamada et al.

[11] Patent Number: 5,909,094
[45] Date of Patent: *Jun. 1, 1999

[54] POWER OUTPUT APPARATUS AND METHOD OF CONTROLLING THE SAME

[75] Inventors: Eiji Yamada, Owariasahi; Takao Miyatani, Toyota; Yasutomo Kawabata, Aichi-ken; Masatoshi Uchida, Toyota, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/635,736

[22] Filed: Apr. 22, 1996

[30] Foreign Application Priority Data

May 19, 1995 [JP] Japan ................................. 7-145575
Aug. 29, 1995 [JP] Japan ................................. 7-245463

[51] Int. Cl.⁶ .................................................. H02P 5/20
[52] U.S. Cl. ........................ 318/140; 318/153; 318/432; 701/22; 701/67; 477/6
[58] Field of Search .................. 364/424.1, 424.026, 364/426; 477/5, 15, 20, 30, 6; 318/140, 56, 254, 32, 141–143, 151–153, 432–434; 192/84.1–84.31; 701/22, 67, 68

[56] References Cited

U.S. PATENT DOCUMENTS

| | | | |
|---|---|---|---|
| 3,623,568 | 11/1971 | Mori . | |
| 3,683,249 | 8/1972 | Shibata . | |
| 3,789,281 | 1/1974 | Shibata . | |
| 3,866,703 | 2/1975 | Eastham | 180/65.1 |
| 4,309,620 | 1/1982 | Heidemeyer et al. | 180/65.2 |
| 4,335,429 | 6/1982 | Kawakatsu | 180/65.2 |
| 4,533,011 | 8/1985 | Bock | 180/65.2 |
| 5,085,101 | 2/1992 | Oldfield | 74/730.1 |
| 5,498,216 | 3/1996 | Bitsche et al. | 477/20 |
| 5,501,641 | 3/1996 | Kollermeyer et al. | 475/107 |
| 5,635,805 | 6/1997 | Ibaraki et al. | 318/139 |
| 5,637,987 | 6/1997 | Fattic et al. | 180/65.3 |
| 5,644,200 | 7/1997 | Yang | 318/139 |
| 5,720,690 | 2/1998 | Hara et al. | 180/65.2 |

FOREIGN PATENT DOCUMENTS

| | | |
|---|---|---|
| 58401/73 | 1/1975 | Australia . |
| 0 645 278 A1 | 3/1995 | European Pat. Off. . |
| 0 725 474 | 8/1996 | European Pat. Off. . |
| 0 725 474 A1 | 8/1996 | European Pat. Off. . |
| 30 25 756 A1 | 1/1982 | Germany . |
| 49-43311 | 4/1974 | Japan . |
| 53-133814 | 11/1978 | Japan . |
| 55-103100 | 8/1980 | Japan . |
| 1-153330 | 6/1989 | Japan . |

*Primary Examiner*—Brian Sircus
*Attorney, Agent, or Firm*—Oliff & Berridge, PLC

[57] ABSTRACT

A power output apparatus (20) of the invention includes an engine (50), a clutch motor (30), an assist motor (40), and a controller (80) for controlling the clutch motor (30) and the assist motor (40). In response to an engine stop signal to stop operation of the engine (50), the controller (80) successively lowers a torque command value of the clutch motor (30) and a target engine torque and a target engine speed of the engine (50) to make the engine (50) kept at an idle. The assist motor (40) is controlled to use power stored in a battery (94) and make up for a decrease in torque output to a drive shaft (22) accompanied by the decrease in torque command value of the clutch motor (30). When the engine (50) falls in the idling state, supply of fuel into the engine (50) is stopped to terminate operation of the engine (50). In this state, the drive shaft (22) is driven and operated only by the torque of the assist motor (40), which is generated by the power stored in the battery (94). This control procedure can stop the engine (50) without varying the torque output to the drive shaft (22).

7 Claims, 15 Drawing Sheets

POWER OUTPUT APPARATUS AND METHOD OF CONTROLLING THE SAME

BACKGROUND OF THE INVENTION

1. Field of the Invention

The present invention generally relates to a power output apparatus and a method of controlling the same. More specifically, the invention pertains to a power output apparatus for efficiently transmitting or outputting a power from an engine to a drive shaft and a method of controlling such a power output apparatus.

2. Description of the Related Art

In proposed power output apparatuses mounted on a vehicle, an output shaft of an engine is electromagnetically connected to a drive shaft linked with a rotor of a motor via an electromagnetic coupling, so that power of the engine is transmitted to the drive shaft (as disclosed in, for example, JAPANESE PATENT LAYING-OPEN GAZETTE No. 53-133814). When the revolving speed of the motor, which starts driving the vehicle, reaches a predetermined level, the proposed power output apparatus supplies an exciting current to the electromagnetic coupling in order to crank the engine, and subsequently carries out fuel injection into the engine as well as spark ignition, thereby starting the engine and enabling the engine to supply power. When the vehicle speed is lowered and the revolving speed of the motor decreases to or below the predetermined level, on the other hand, the power output apparatus stops the supply of exciting current to the electromagnetic coupling as well as fuel injection into the engine and spark ignition, thereby terminating operation of the engine.

In the known power output apparatus described above, the torque output to the drive shaft is significantly varied at the time of starting and stopping the engine. This results in a rough ride. At the time of starting the engine, the torque output from the motor is used to crank the engine, and the torque output to the drive shaft is decreased by the amount required for cranking. At the time of stopping the engine, the supply of exciting current is stopped while the power from the engine is transmitted to the drive shaft via the electromagnetic coupling, and the torque output to the drive shaft is decreased by the amount of power transmitted from the engine. Such a fall in output torque occurs unexpectedly since the driver does not determine the time of starting or stopping the engine. Compared with the expected variation, the unexpected variation in output torque to the drive shaft gives a greater shock to the driver, thereby resulting in a rough drive.

SUMMARY OF THE INVENTION

The object of the invention is thus to provide a power output apparatus which can transmit or output a power from an engine to a drive shaft at a high efficiency.

Another object of the invention is to stop the engine without varying the torque output to the drive shaft, and a method of controlling such a power output apparatus.

The above and other related objected are realized at least partly by a first power output apparatus for outputting a power to a drive shaft. The first power output apparatus comprises: an engine having an output shaft; engine driving means for driving the engine; a first motor comprising a first rotor connected with the output shaft of the engine and a second rotor connected with the drive shaft, the second rotor being coaxial to and rotatable relative to the first rotor, whereby power is transmitted between the output shaft of the engine and the drive shaft via an electromagnetic connection of the first rotor and the second rotor; a first motor-driving circuit for controlling degree of electromagnetic connection of the first rotor and the second rotor in the first motor and regulating rotation of the second rotor relative to the first rotor; a second motor connected with the drive shaft; a second motor-driving circuit for driving and controlling the second motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; power decrease signal detection means for detecting power decrease signal to decrease power output from the engine; driving circuit control means for, when the power decrease signal detection means detects the power decrease signal, controlling the first motor-driving circuit in response to the signal to gradually decrease the degree of electromagnetic connection of the first rotor with the second rotor in the first motor and controlling the second motor-driving circuit to enable the second motor to use power stored in the storage battery and make up for a decrease in power transmitted by the first motor accompanied by the decrease in degree of electromagnetic connection; and engine power decreasing means for controlling the engine driving means to decrease the power output from the engine with the decrease in the degree of electromagnetic connection of the first rotor with the second rotor accomplished by the driving circuit control means.

The first power output apparatus of the invention can efficiently transmit or output the power from the engine to the drive shaft by the functions of the first and the second motors. In response to the power decrease signal, the degree of electromagnetic coupling of the first rotor with the second rotor in the first motor is gradually decreased. The second motor is then controlled to make up for the decrease in transmitted power, which is accompanied by the decrease in degree of electromagnetic coupling, with the power stored in the secondary cell. This structure effectively decreases the power output from the engine without varying the power output to the drive shaft.

In accordance with one aspect of the first power output apparatus, the power decrease signal detection means comprises means for detecting an engine stop signal to stop operation of the engine, and the engine power decreasing means comprises means for controlling the engine driving means to stop supply of fuel into the engine and terminate operation of the engine when the driving circuit control means releases the electromagnetic connection of the first rotor with the second rotor in the first motor.

In accordance with one aspect, the present invention is directed to a second power output apparatus for outputting a power to a drive shaft. The second power output apparatus comprises: an engine having an output shaft; engine driving means for driving the engine; a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the second rotor and the stator constituting a second motor; a first motor-driving circuit for driving and controlling the first motor in the complex motor; a second motor-driving circuit for driving and controlling the second motor in the complex motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; power decrease signal detection means for detecting power decrease signal to decrease power output from the engine; driving circuit control means for, when the power decrease signal detection means detects the power decrease signal, controlling the first motor-driving circuit in response to the signal to gradually decrease the degree of electromagnetic connection of the first rotor with the second rotor in the first motor and controlling the second motor-driving circuit to enable the second motor to use power stored in the storage battery and make up for a decrease in power transmitted by the first motor accompanied by the decrease in degree of electromagnetic connection; and engine power decreasing means for controlling the engine driving means to decrease the power output from the engine with the decrease in the degree of electromagnetic connection of the first rotor with the second rotor accomplished by the driving circuit control means.

The second power output apparatus of the invention can efficiently transmit or output the power from the engine to the drive shaft by the functions of the first motor, which consists of the first rotor and the second rotor of the complex motor, and the second motor, which consists of the second rotor and the stator. In response to the power decrease signal, the degree of electromagnetic coupling of the first rotor with the second rotor in the first motor is gradually decreased. The second motor is then controlled to make up for the decrease in transmitted power, which is accompanied by the decrease in degree of electromagnetic coupling, with the power stored in the secondary cell. This structure effectively decreases the power output from the engine without varying the power output to the drive shaft. The structure including the first motor and the second motor integrally joined with each other realizes a compact power output apparatus.

In accordance with one aspect of the second power output apparatus, the power decrease signal detection means comprises means for detecting an engine stop signal to stop operation of the engine, and the engine power decreasing means comprises means for controlling the engine driving means to stop supply of fuel into the engine and terminate operation of the engine when the driving circuit control means releases the electromagnetic connection of the first rotor with the second rotor in the first motor.

In accordance with another aspect, the invention is also directed to a third power output apparatus for outputting a power to a drive shaft. The third power output apparatus comprises: an engine having an output shaft; engine driving means for driving the engine; a first motor comprising a first rotor connected with the output shaft of the engine and a second rotor connected with the drive shaft, the first motor being coaxial to and rotatable relative to the first rotor, whereby power is transmitted between the output shaft of the engine and the drive shaft via an electromagnetic connection of the first rotor and the second rotor; a first motor-driving circuit for controlling degree of electromagnetic connection of the first rotor and the second rotor in the first motor and regulating rotation of the second rotor relative to the first rotor; a second motor connectied with the output shaft of the engine; a second motor-driving circuit for driving and controlling the second motor; a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; power decrease signal detection means for detecting power decrease signal to decrease power output from the engine; engine power decreasing means for, when the power decrease signal detection means detects the power decrease signal, controlling the engine driving means in response to the signal to gradually decrease the power output from the engine; and driving circuit control means for controlling the first motor-driving circuit and the second motor-driving circuit to enable the first motor and the second motor to use power stored in the storage battery and make up for the decrease in power output from the engine accomplished by the engine power decreasing means.

The third power output apparatus of the invention can efficiently transmit or output the power from the engine to the drive shaft by the functions of the first and the second motors. In response to the power decrease signal, the power output from the engine is gradually decreased. The first motor and the second motor are then controlled to make up for the decrease in power output from the engine with the power stored in the secondary cell. This structure effectively decreases the power output from the engine without varying the power output to the drive shaft.

In accordance with one aspect of the third power output apparatus, the driving circuit control means comprises meane for controlling the first motor-driving circuit to enable the first motor to make up for a decrease in revolving speed of the output shaft of the engine among the decrease in power output from the engine, and controlling the second motor-driving circuit to enable the second motor to make up for a decrease in torque among the decrease in power output from the engine. In this structure, the power decrease signal detection means comprises meane for detecting an engine stop signal to stop operation of the engine, and the engine power decreasing means comprises meane for controlling the engine driving means to stop supply of fuel into the engine and terminate operation of the engine when the power output from the engine becomes equal to zero.

In accordance with still another aspect, the invention also provides a fourth power output apparatus for outputting a power to a drive shaft. The fourth power output apparatus comprises: an engine having an output shaft; engine driving means for driving the engine; a complex motor comprising a first rotor connected with the output shaft of the engine, a second rotor connected with the drive shaft being coaxial to and rotatable relative to the first rotor, and a stator for rotating the first rotor, the first rotor and the second rotor constituting a first motor, the first rotor and the stator constituting a second motor; a first motor-driving circuit for driving and controlling the first motor in the complex motor; a second motor-driving circuit for driving and controlling the second motor in the complex motor;

a storage battery being charged with power regenerated by the first motor via the first motor-driving circuit, being charged with power regenerated by the second motor via the second motor-driving circuit, discharging power required to drive the first motor via the first motor-driving circuit, and discharging power required to drive the second motor via the second motor-driving circuit; power decrease signal detection means for detecting power decrease signal to decrease power output from the engine; engine power decreasing means for, when the power decrease signal detection means detects the power decrease signal, controlling the engine driving means in response to the signal to gradually decrease the power output from the engine; and driving circuit control means for controlling the first motor-driving circuit and the second motor-driving circuit to enable the first motor and the second motor to use power stored in the storage battery and make up for the decrease in power output from the engine accomplished by the engine power decreasing means.

The fourth power output apparatus of the invention can efficiently transmit or output the power from the engine to the drive shaft by the functions of the first motor, which consists of the first rotor and the second rotor of the complex motor, and the second motor, which consists of the first rotor and the stator. In response to the power decrease signal, the power output from the engine is gradually decreased. The first motor and the second motor are then controlled to make up for the decrease in power output from the engine with the power stored in the secondary cell. This structure effectively decreases the power output from the engine without varying the power output to the drive shaft. The structure including the first motor and the second motor integrally joined with each other realizes a compact power output apparatus.

In accordance with one aspect of the fourth power output apparatus, the driving circuit control means comprises means for controlling the first motor-driving circuit to enable the first motor to make up for a decrease in revolving speed of the output shaft of the engine among the decrease in power output from the engine, and controlling the second motor-driving circuit to enable the second motor to make up for a decrease in torque among the decrease in power output from the engine. In this structure, the power decrease signal detection means comprises means for detecting an engine stop signal to stop operation of the engine, and the engine power decreasing means comprises means for controlling the engine driving means to stop supply of fuel into the engine and terminate operation of the engine when the power output from the engine becomes equal to zero.

The above objects are also realized at least partly by a first method of controlling a power output apparatus for outputting a power to a drive shaft. The first method comprises the steps of: (a) providing an engine having an output shaft; engine driving means for driving the engine; a first motor comprising a first rotor connected with the output shaft of the engine and a second rotor connected with the drive shaft, the first motor being coaxial to and rotatable relative to the first rotor, whereby power is transmitted between the output shaft of the engine and the drive shaft via an electromagnetic connection of the first rotor and the second rotor; a second motor connected with the drive shaft; and a storage battery being charged with power regenerated by the first motor, being charged with power regenerated by the second motor, discharging power required to drive the first motor, and discharging power required to drive the second motor; (b) detecting power decrease signal to decrease power output from the engine; (c) controlling the first motor in response to the power decrease signal, to gradually decrease the degree of electromagnetic connection of the first rotor with the second rotor in the first motor; (d) controlling the second motor to enable the second motor to use power stored in the storage battery and make up for a decrease in power transmitted by the first motor accompanied by the decrease in degree of electromagnetic connection; and (e) controlling the engine driving means to decrease the power output from the engine with the decrease in degree of electromagnetic connection of the first rotor with the second rotor accomplished in the step (c).

In accordance with one aspect of the first method, the power decrease signal detected represents an engine stop signal to stop operation of the engine, and the step (e) further comprises the step of controlling the engine driving means to stop supply of fuel into the engine and terminate operation of the engine when the electromagnetic connection of the first rotor with the second rotor in the first motor has been decreased to a release position in response to the engine stop signal.

In accordance with one aspect, the invention is also directed to a second method of controlling a power output apparatus for outputting a power to a drive shaft. The second method comprises the steps of: (a) providing an engine having an output shaft; engine driving means for driving the engine; a first motor comprising a first rotor connected with the output shaft of the engine and a second rotor connected with the drive shaft, the second rotor being coaxial to and rotatable relative to the first rotor, whereby power is transmitted between the output shaft of the engine and the drive shaft via an electromagnetic connection of the first rotor and the second rotor; a second motor connected with the output shaft of the engine; and a storage battery being charged with power regenerated by the first motor, being charged with power regenerated by the second motor, discharging power required to drive the first motor, and discharging power required to drive the second motor; (b) detecting power decrease signal to decrease power output from the engine; (c) controlling the engine driving means in response to the power decrease signal, to gradually decrease the power output from the engine; and (d) controlling the first motor and the second motor to enable the first motor and the second motor to use power stored in the storage battery and make up for the decrease in power output from the engine accomplished in the step (c).

In accordance with one aspect of the second method, the step (d) further comprises the steps of: (e) controlling the first motor to enable the first motor to make up for a decrease in revolving speed of the output shaft of the engine among the decrease in power output from the engine; and (f) controlling the second motor to enable the second motor to make up for a decrease in torque among the decrease in power output from the engine.

These and other objects, features, aspects, and advantages of the present invention will become more apparent from the following detailed description of the preferred embodiments with the accompanying drawings.

DETAILED DESCRIPTION OF PREFERRED EMBODIMENTS

Figure 1:
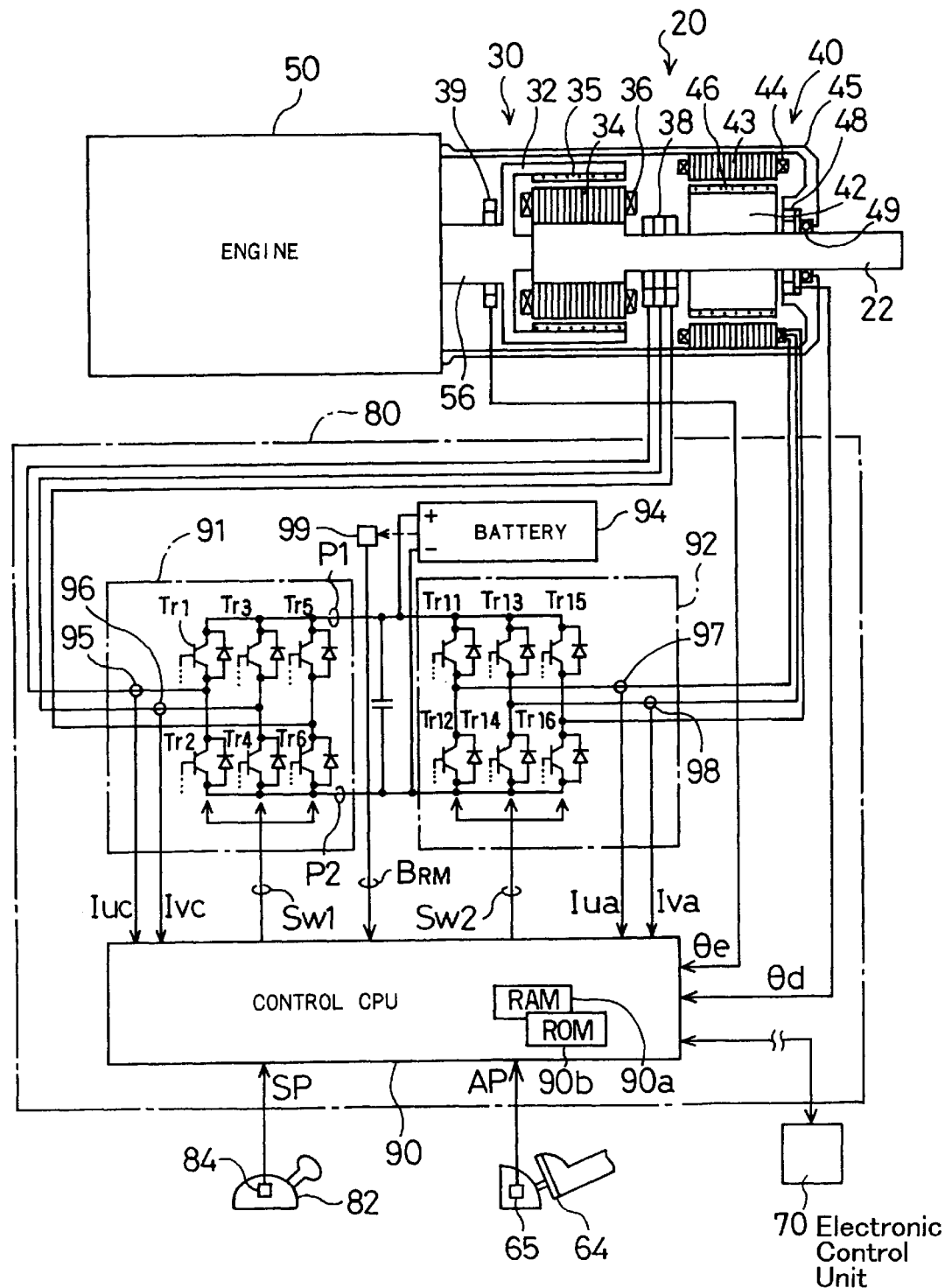
FIG. 1 is a schematic view illustrating structure of a power output apparatus 20 as a first embodiment according to the present invention.
Figure 2:
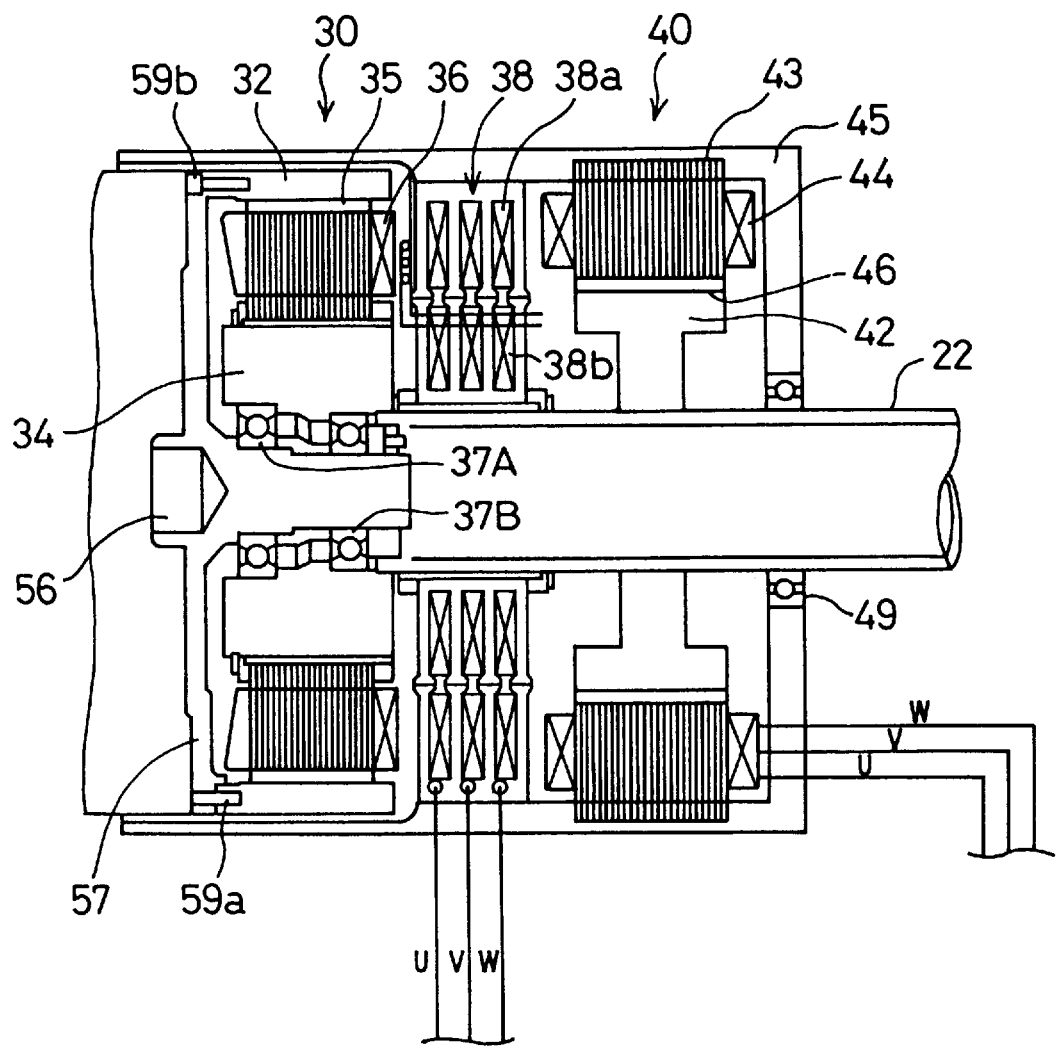
FIG. 2 is a cross sectional view illustrating detailed structures of a clutch motor 30 and an assist motor 40 included in the power output apparatus 20 of FIG. 1.
Figure 3:
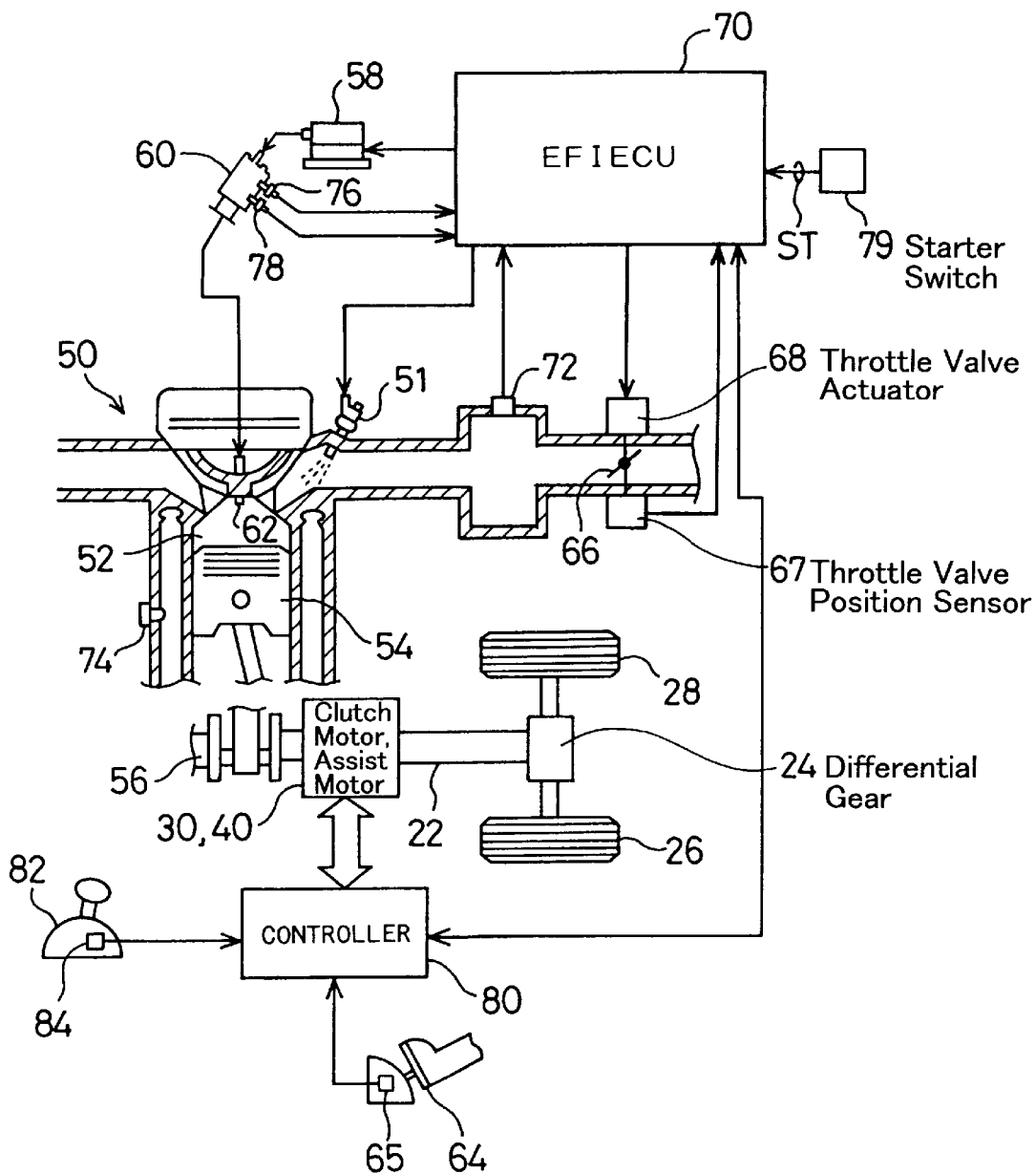
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating a general structure of a vehicle with the power output apparatus 20 of FIG. 1 incorporated therein. The general structure of the vehicle is described first as a matter of convenience.

Referring to FIG. 3, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark, which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle valve position sensor 67 for detecting the position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Referring to FIG. 1, the power output apparatus 20 essentially includes the engine 50, the clutch motor 30 with an outer rotor 32 and an inner rotor 34, the assist motor 40 with a rotor 42, and the controller 80 for driving and controlling the clutch motor 30 and the assist motor 40. The outer rotor 32 of the clutch motor 30 is mechanically connected to the crankshaft 56 of the engine 50, whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle $\theta e$ of the crankshaft 56 is attached to the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle $\theta d$ of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like element, to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38$a$ fixed to the casing 45 and secondary windings 38$b$ attached to the drive shaft 22 coupled with the inner rotor 34. Electromagnetic induction allows electric power to be transmitted from the primary windings 38$a$ to the secondary windings 38$b$ or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90$a$ used as a working memory, a ROM 90$b$ in which various control programs are stored, an input/output port (not shown), and a serial communication port (not shown) through which data are sent to and received from the EFIECU 70. The control CPU 90 receives a variety of data through the input/output port. The input data include a rotational angle $\theta$e of the crankshaft 56 of the engine 50 from the resolver 39, a rotational angle $\theta$d of the drive shaft 22 from the resolver 48, an accelerator pedal position AP (pressing amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRM of the battery 94 by any known method; for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal SW1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The power output apparatus 20 thus constructed works in accordance with the operation principles described below, especially with the principle of torque conversion. By way of example, it is assumed that the engine 50 driven by the EFIECU 70 rotates at a revolving speed Ne equal to a predetermined value N1. While the transistors Tr1 through Tr6 in the first driving circuit 91 are in OFF position, the controller 80 does not supply any current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between the revolving speed Ne of the crankshaft 56 of the engine 50 and a revolving speed Nd of the drive shaft 22 (that is, difference Nc (=Ne-Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moment, the inner rotor 34 rotates at the revolving speed Nd, which is lower than the revolving speed Ne of the crankshaft 56 of the engine 50. In this state, the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Figure 4:
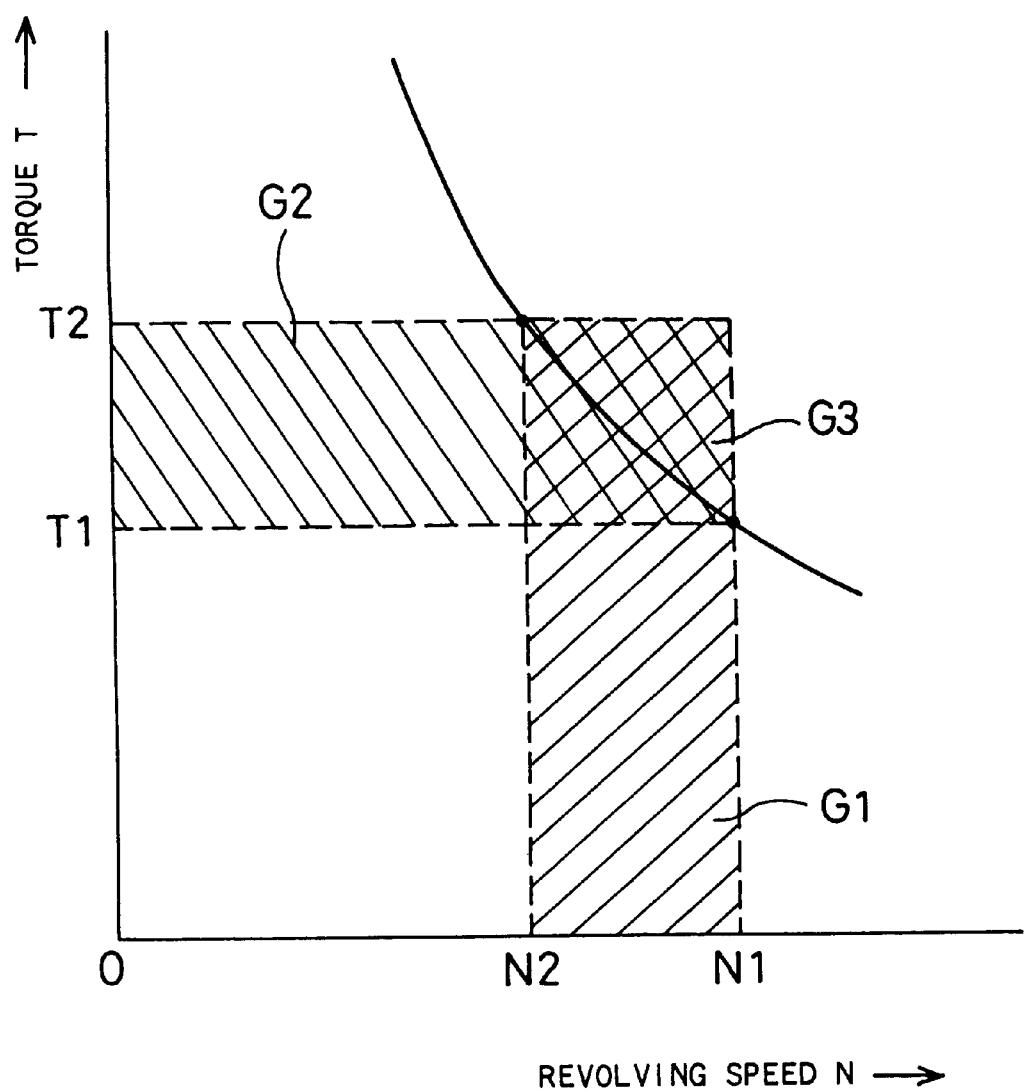
FIG. 4 is a graph showing the operation principle of the power output apparatus 20.

Referring to FIG. 4, while the crankshaft 56 of the engine 50 is driven at a revolving speed N1 and a torque T1, energy in a region G1 is regenerated as electric power by the clutch motor 30. The regenerated power is supplied to the assist motor 40 and converted to energy in a region G2, which enables the drive shaft 22 to rotate at a revolving speed N2 and a torque T2. The torque conversion is carried out in the manner discussed above, and the energy corresponding to the slip in the clutch motor 30 or the revolving speed difference Nc (=Ne-Nd) is consequently given as a torque to the drive shaft 22.

In another example, it is assumed that the engine 50 is driven at a revolving speed Ne=N2 and a torque Te=T2, whereas the drive shaft 22 is rotated at the revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne-Nd). While functioning as a normal motor, the clutch motor 30 consumes electric power to apply the energy of rotational motion to the drive shaft 22. When the control CPU 90 of the controller 80 controls the second driving circuit 92 to enable the assist motor 40 to regenerate electrical energy, a slip between the rotor 42 and the stator 43 of the assist motor 40 makes the regenerative current flow through the three-phase coils 44. In order to allow the clutch motor 30 to consume the energy regenerated by the assist motor 40, the control CPU 90 controls both the first driving circuit 91 and the second driving circuit 92. This enables the clutch motor 30 to be driven without using any electric power stored in the battery 94.

Referring back to FIG. 4, when the crankshaft 56 of the engine 50 is driven at the revolving speed N2 and the torque T2, energy in the sum of regions G2 and G3 is regenerated as electric power by the assist motor 40 and supplied to the clutch motor 30. Supply of the regenerated power enables the drive shaft 22 to rotate at the revolving speed N1 and the torque T1.

Other than the torque conversion and revolving speed conversion discussed above, the power output apparatus 20 of the embodiment can charge the battery 94 with an excess of electrical energy or discharge the battery 94 to supplement the electrical energy. This is implemented by controlling the mechanical energy output from the engine 50 (that is, the product of the torque Te and the revolving speed Ne), the electrical energy regenerated or consumed by the clutch motor and the electrical energy regenerated or consumed by the assist motor 40. The output energy from the engine 50 can thus be transmitted as power to the drive shaft 22 at a higher efficiency.

Figure 5:
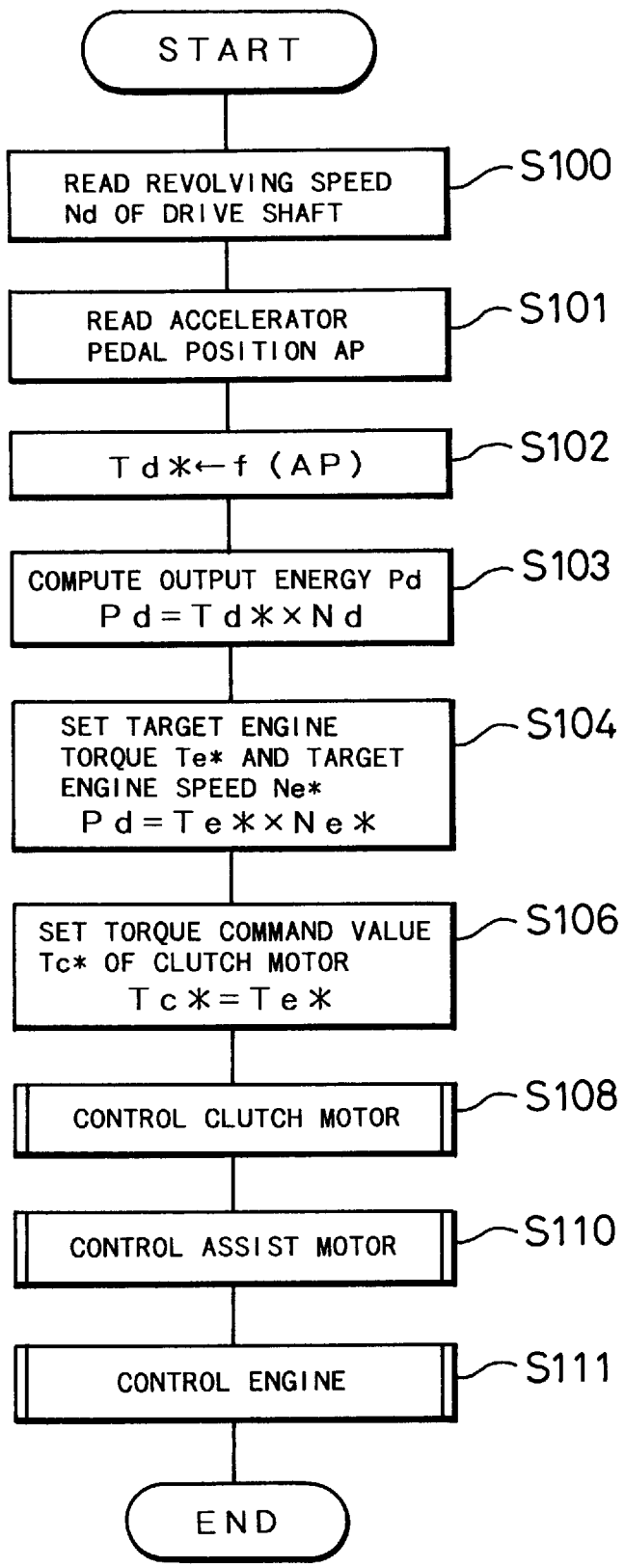
FIG. 5 is a flowchart showing a torque control routine executed by the controller 80.

The torque conversion discussed above is implemented by a torque control process illustrated in the flowchart of FIG. 5. The torque control routine of FIG. 5 is executed to control the torque while the battery 94 is not charged or discharged.

When the program enters the torque control routine, the control CPU 90 of the controller 80 first receives data of revolving speed Nd of the drive shaft 22 at step S100. The revolving speed Nd of the drive shaft 22 can be computed from the rotational angle θd of the drive shaft 22 read from the resolver 48. The control CPU 90 then reads the accelerator pedal position AP from the accelerator position sensor 65 at step S101. The driver steps in the accelerator pedal 64 when feeling insufficiency of output torque. The value of the accelerator pedal position AP accordingly corresponds to the desired output torque (that is, torque of the drive shaft 22) which the driver requires. At subsequent step S102, the control CPU 90 computes a target output torque (torque of drive shaft 22) Td* corresponding to the input accelerator pedal position AP. The target output torque Td* is also referred to as the output torque command value. Output torque command values Td* have previously been set for the respective accelerator pedal positions AP. In response to an input of the accelerator pedal position AP, the output torque command value Td* corresponding to the input accelerator pedal position AP is extracted from the preset output torque command values Td*.

At step S103, an energy Pd to be output to the drive shaft 22 is calculated according to the expression Pd=Td*×Nd, that is, multiplying the extracted output torque command value Td* (of the drive shaft 22) by the input revolving speed Nd of the drive shaft 22. The program then proceeds to step S104 at which the control CPU 90 sets a target engine torque Te* and a target engine speed Ne* of the engine 50 based on the output energy Pd thus obtained. Here it is assumed that all the energy Pd to be output to the drive shaft 22 is supplied from the engine 50. Since the energy supplied by the engine 50 is equal to the product of the torque Te and the revolving speed Ne of the engine 50, the relationship between the output energy Pd and the target engine torque Te* and the target engine speed Ne* can be expressed as Pd=Te*×Ne*. There are, however, numerous combinations of the target engine torque Te* and the target engine speed Ne* satisfying the above relationship. In this embodiment, an optimal combination of the target engine torque Te* and the target engine speed Ne* is selected in order to realize operation of the engine 50 at the possible highest efficiency.

At subsequent step S106, the control CPU 90 sets a torque command value Tc* of the clutch motor 30, based on the target engine torque Te* set at step S104. In order to keep the revolving speed Ne of the engine 50 at a substantially constant level, it is required to make the torque of the clutch motor 30 balance the torque of the engine 50. The processing at step S106 accordingly sets the torque command value Tc* of the clutch motor 30 equal to the target engine torque Te* of the engine 50.

After setting the torque command value Tc* of the clutch motor 30 at step S106, the program proceeds to steps S108, S110, and S111 to control the clutch motor 30, the assist motor 40, and the engine 50, respectively. As a matter of convenience, the control operations of the clutch motor 30, the assist motor 40, and the engine 50 are shown as separate steps. In the actual procedure, however, these control operations are carried out comprehensively. For example, the control CPU 90 simultaneously controls the clutch motor 30 and the assist motor 40 by interrupt process, while transmitting an instruction to the EFIECU 70 through communication to control the engine 50 concurrently.

Figure 6:
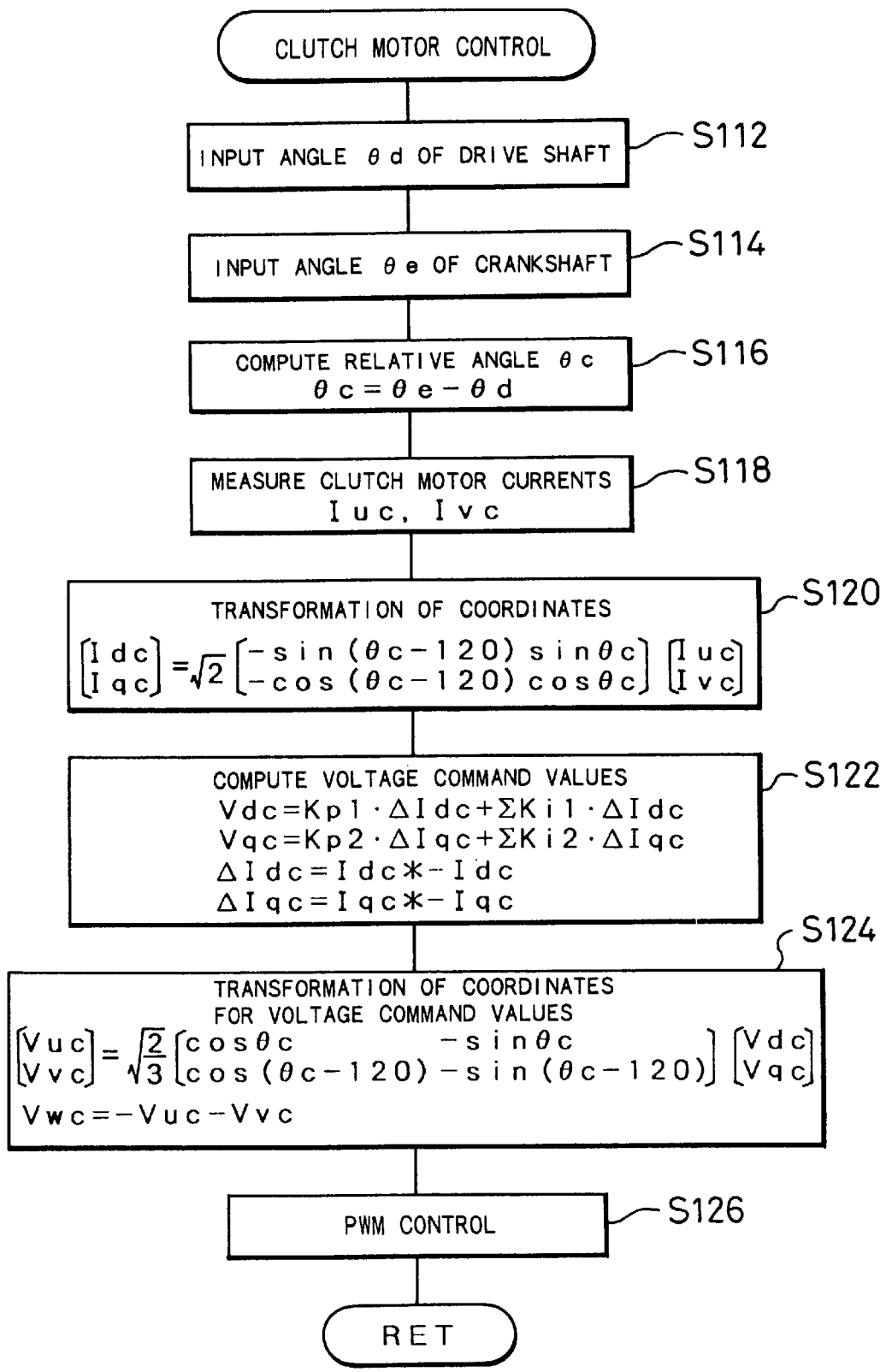
FIG. 6 is a flowchart showing essential steps of controlling the clutch motor 30 executed by the controller 80.

The control of the clutch motor 30 (step S108 of FIG. 5) is implemented according to a clutch motor control routine illustrated in the flowchart of FIG. 6. When the program enters the clutch motor control routine, the control CPU 90 of the controller 80 first reads a rotational angle θd of the drive shaft 22 from the resolver 48 at step S112 and a rotational angle θe of the crankshaft 56 of the engine 50 from the resolver 39 at step S114. The control CPU 90 then computes a relative angle θc of the drive shaft 22 and the crankshaft 56 by the equation of θc=θe−θd at step S116.

The program proceeds to step S118, at which the control CPU 90 receives inputs of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin \theta c \\ -\cos(\theta c - 120) & \cos \theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases. After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and Vqc for the d and q axes at step S122. In accordance with a concrete procedure, the control CPU 90 executes operations following Equations (2) and Equations (3) given below:

$$\Delta Idc = Idc^* - Idc$$

$$\Delta Iqc = Iqc^* - Iqc \quad (2)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (3)$$

wherein Kp1, Kp2, Ki1, and Ki2 represent coefficients, which are adjusted to be suited to the characteristics of the motor applied.

The voltage command value Vdc (Vqc) includes a part in proportion to the deviation $\Delta I$ from the current command value I* (first term in right side of Equation (3)) and a summation of historical data of the deviations $\Delta I$ for 'i' times (second term in right side). The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos \theta c & \sin \theta c \\ -\cos(\theta c - 120) & -\sin(\theta c - 120) \end{bmatrix} \begin{bmatrix} Vdc \\ Vqc \end{bmatrix} \quad (4)$$

$$Vwc = -Vuc - Vvc$$

The actual voltage control is executed through on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values determined by Equation (4) above.

The torque command value Tc* is positive when a positive torque is applied to the drive shaft 22 in the direction of rotation of the crankshaft 56. By way of example, it is assumed that a positive value is set to the torque command value Tc*. When the revolving speed Ne of the engine 50 is greater than the revolving speed Nd of the drive shaft 22 on this assumption, that is, when the revolving speed difference Nc (=Ne-Nd) is positive, the clutch motor 30 is controlled to carry out the regenerative operation and produce a regenerative current corresponding to the revolving speed difference Nc. When the revolving speed Ne of the engine 50 is less than the revolving speed Nd of the drive shaft 22, that is, when the revolving speed difference Nc (=Ne-Nd) is negative, on the contrary, the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the rotating magnetic field generated by the currents flowing through the three-phase coils 36 on the inner rotor 34 in the clutch motor 30. The identical switching control is executed for both the regenerative operation and the power operation of the clutch motor 30 as long as the sign of the torque command value Tc* is not changed. The clutch motor control routine of FIG. 6 is thus applicable to both the regenerative operation and the power operation. Under the condition of braking the drive shaft 22 or moving the vehicle in reverse, the torque command value Tc* has the negative sign. The clutch motor control routine of FIG. 6 is also applicable to the control procedure under such conditions, when the relative angle $\theta c$ is varied in the reverse direction at step S126.

Figure 7:
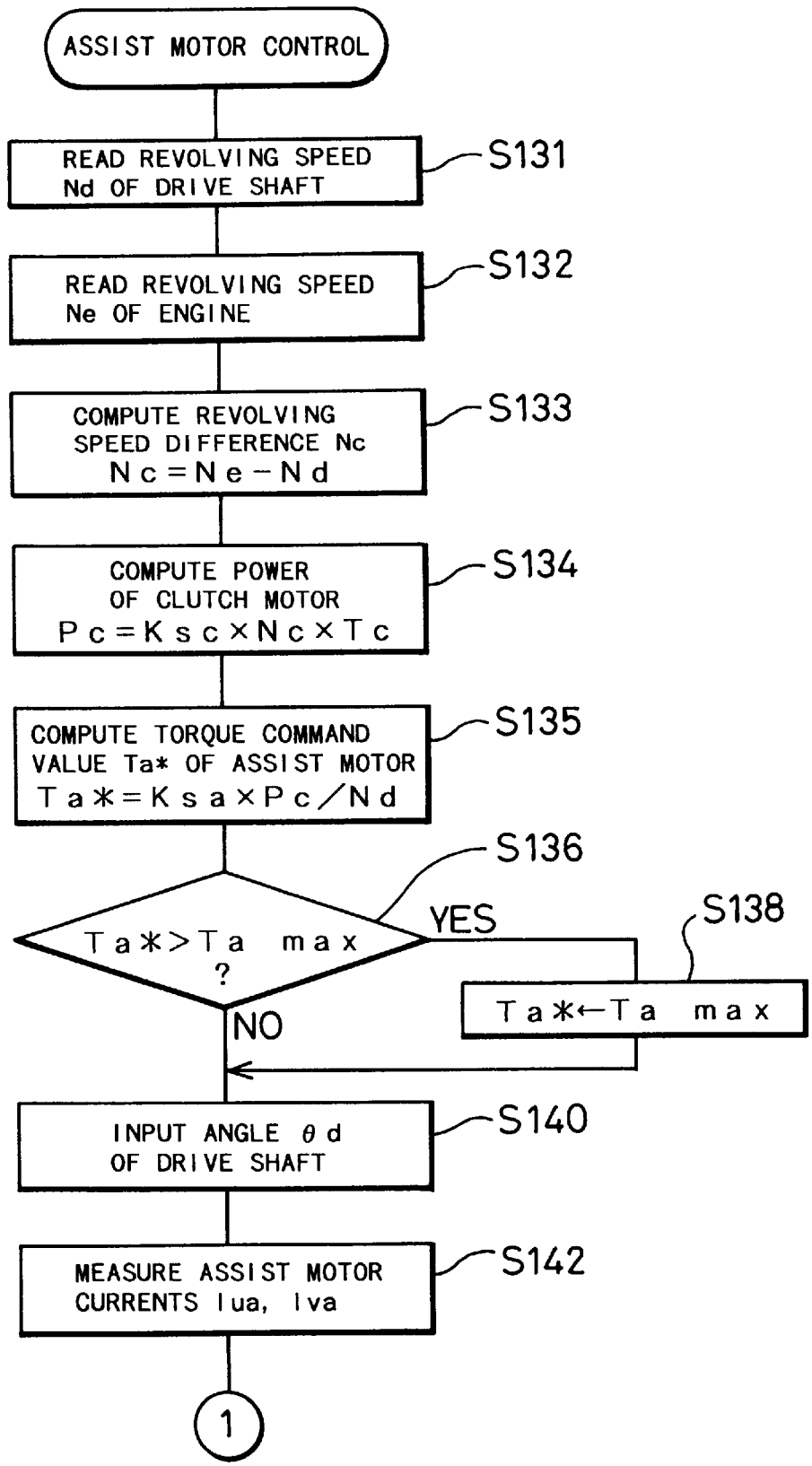
FIGS. 7 and 8 are flowcharts showing essential steps of controlling the assist motor 40 executed by the controller 80.
Figure 8:
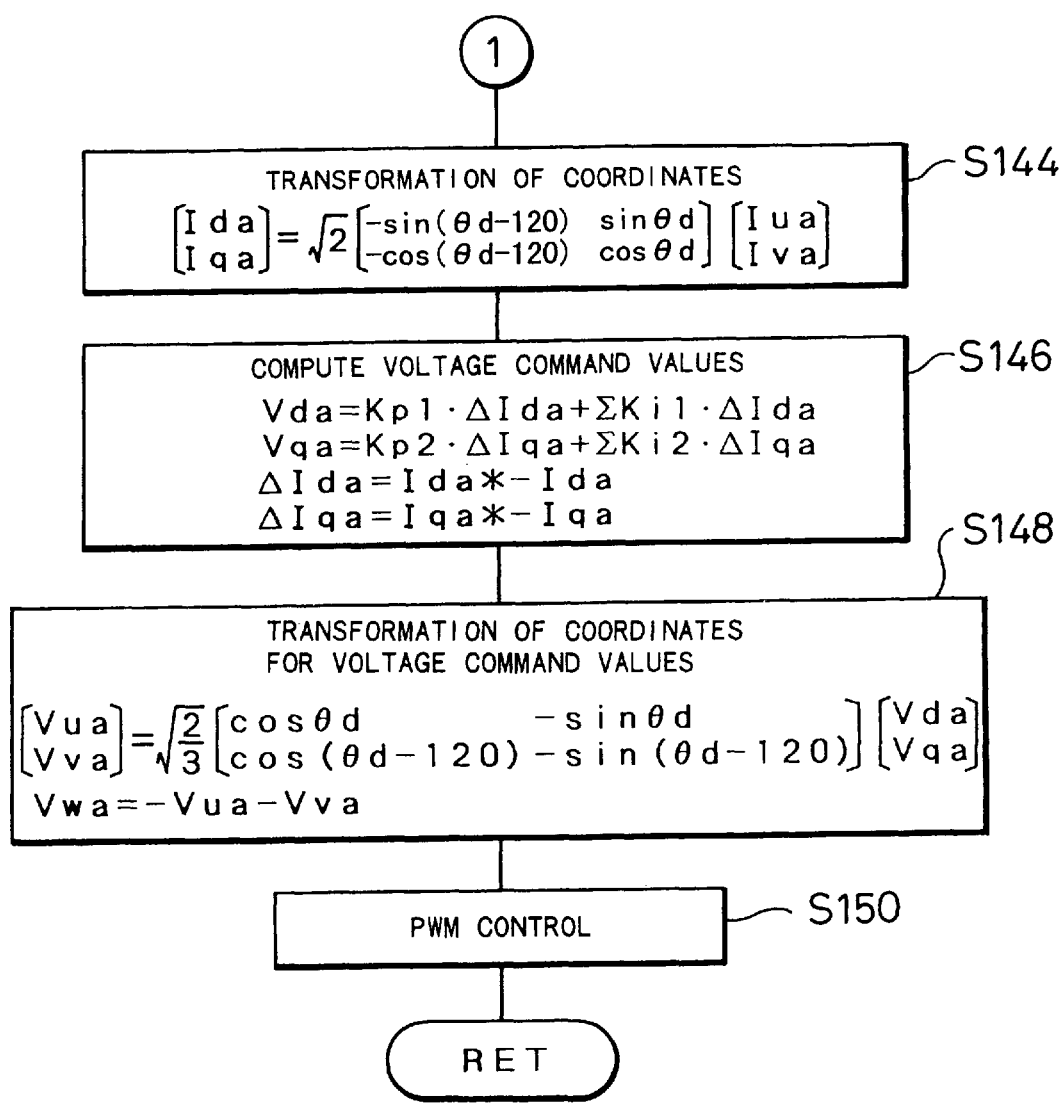

FIGS. 7 and 8 are flowcharts showing details of the control process of the assist motor 40 executed at step S110 in the flowchart of FIG. 5. Referring to the flowchart of FIG. 7, when the program enters the assist motor control routine, the control CPU 90 first receives data of revolving speed Nd of the drive shaft 22 at step S131. The revolving speed Nd of the drive shaft 22 is computed from the rotational angle $\theta d$ of the drive shaft 22 read from the resolver 48. The control CPU 90 then receives data of revolving speed Ne of the engine 50 at step S132. The revolving speed Ne of the engine 50 may be computed from the rotational angle $\theta e$ of the crankshaft 56 read from the resolver 39 or directly measured by the speed sensor 76 mounted on the distributor 60. In the latter case, the control CPU 90 receives data of revolving speed Ne of the engine 50 through communication with the EFIECU 70, which connects with the speed sensor 76.

A revolving speed difference Nc between the input revolving speed Nd of the drive shaft 22 and the input revolving speed Ne of the engine 50 is calculated according to the equation Nc=Ne-Nd at step S133. At subsequent step S134, electric power (energy) Pc regenerated or consumed by the clutch motor 30 is calculated according to Equation (5) given as:

$$Pc = Ksc \times Nc \times Tc \quad (5)$$

wherein Ksc represents the efficiency of regenerative operation or power operation in the clutch motor 30. The product Nc×Tc defines the energy corresponding to the region G1 in the graph of FIG. 4, wherein Nc and Tc respectively denote the revolving speed difference and the actual torque produced by the clutch motor 30.

At step S135, a torque command value Ta* of the assist motor 40 is determined by Equation (6) given as:

$$Ta^* = ksa \times Pc / Nd \quad (6)$$

wherein ksa represents the efficiency of regenerative operation or power operation in the assist motor 40. The torque command value Ta* of the assist motor 40 thus obtained is compared with a maximum torque Tamax, which the assist motor 40 can potentially apply, at step S136. When the torque command value Ta* exceeds the maximum torque Tamax, the program proceeds to step S138 at which the torque command value Ta* is restricted to the maximum torque Tamax.

After the torque command value Ta* is set equal to the maximum torque Tamax at step S138 or after the torque command value Ta* is determined not to exceed the maximum torque Tamax at step S136, the program proceeds to step S140 in the flowchart of FIG. 8. The control CPU 90 reads the rotational angle θd of the drive shaft 22 from the resolver 48 at step S140, and receives data of assist motor currents Iua and Iva, which respectively flow through the U phase and V phase of the three-phase coils 44 in the assist motor 40, from the ammeters 97 and 98 at step S142. The control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on- and off-time of the transistors Tr11 through Tr16 in the second driving circuit 92 for PWM (pulse width modulation) control. The processing executed at steps S144 through S150 is similar to that executed at steps S120 through S126 of the clutch motor control routine shown in the flowchart of FIG. 6.

The assist motor 40 is subject to the power operation for the positive torque command value Ta* and the regenerative operation for the negative torque command value Ta*. Like the power operation and the regenerative operation of the clutch motor 30, the assist motor control routine of FIGS. 7 and 8 is applicable to both the power operation and the regenerative operation of the assist motor 40. This is also true when the drive shaft 22 rotates in reverse of the rotation of the crankshaft 56, that is, when the vehicle moves back. The torque command value Ta* of the assist motor 40 is positive when a positive torque is applied to the drive shaft 22 in the direction of rotation of the crankshaft 56.

The control of the engine 50 (step S111 in FIG. 5) is executed in the following manner. In order to attain stationary driving at the target engine torque Te* and the target engine speed Ne* (set at step S104 in FIG. 5), the control CPU 90 regulates the torque Te and the revolving speed Ne of the engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the engine 50 eventually approach the target engine torque Te* and the target engine speed Ne*.

This procedure enables the output (Te×Ne) of the engine 50 to undergo go the free torque conversion and be eventually transmitted to the drive shaft 22.

Charging control of the battery 94 starts when the residual capacity BRM of the battery 94 becomes equal to or less than a charge-initiating value BL, which has previously been set as a value requiring the charging process. Charging energy Pbi required for charging the battery 94 is added to the output energy Pd calculated at step S103 in the torque control routine of FIG. 5. The processing at step S104 and subsequent steps is executed with the newly set output energy Pd. On the other hand, the charging energy Pbi is subtracted from the power Pc of the clutch motor 30 calculated at step S134 in the assist motor control routine of FIG. 7. The processing at step S135 and subsequent steps is executed with the newly set clutch motor power Pc. This procedure enables the battery 94 to be charged with the charging energy Pbi.

On the other hand, discharge control of the battery 94 starts when the residual capacity BRM of the battery 94 becomes equal to or more than a discharge-initiating value BH, which has been set as a value requiring the discharging process. A discharging energy Pbo required for discharging the battery 94 is subtracted from the output energy Pd calculated at step S103 in the torque control routine of FIG. 5. The processing at step S104 and subsequent steps is executed with the newly set output energy Pd. On the other hand, the discharging energy Pbo is added to the power Pc of the clutch motor 30 calculated at step S134 in the assist motor control routine of FIG. 7. The processing at step S135 and subsequent steps is executed with the newly set clutch motor power Pc. This procedure enables the battery 94 to be discharged with the discharging energy Pbo.

Figure 9:
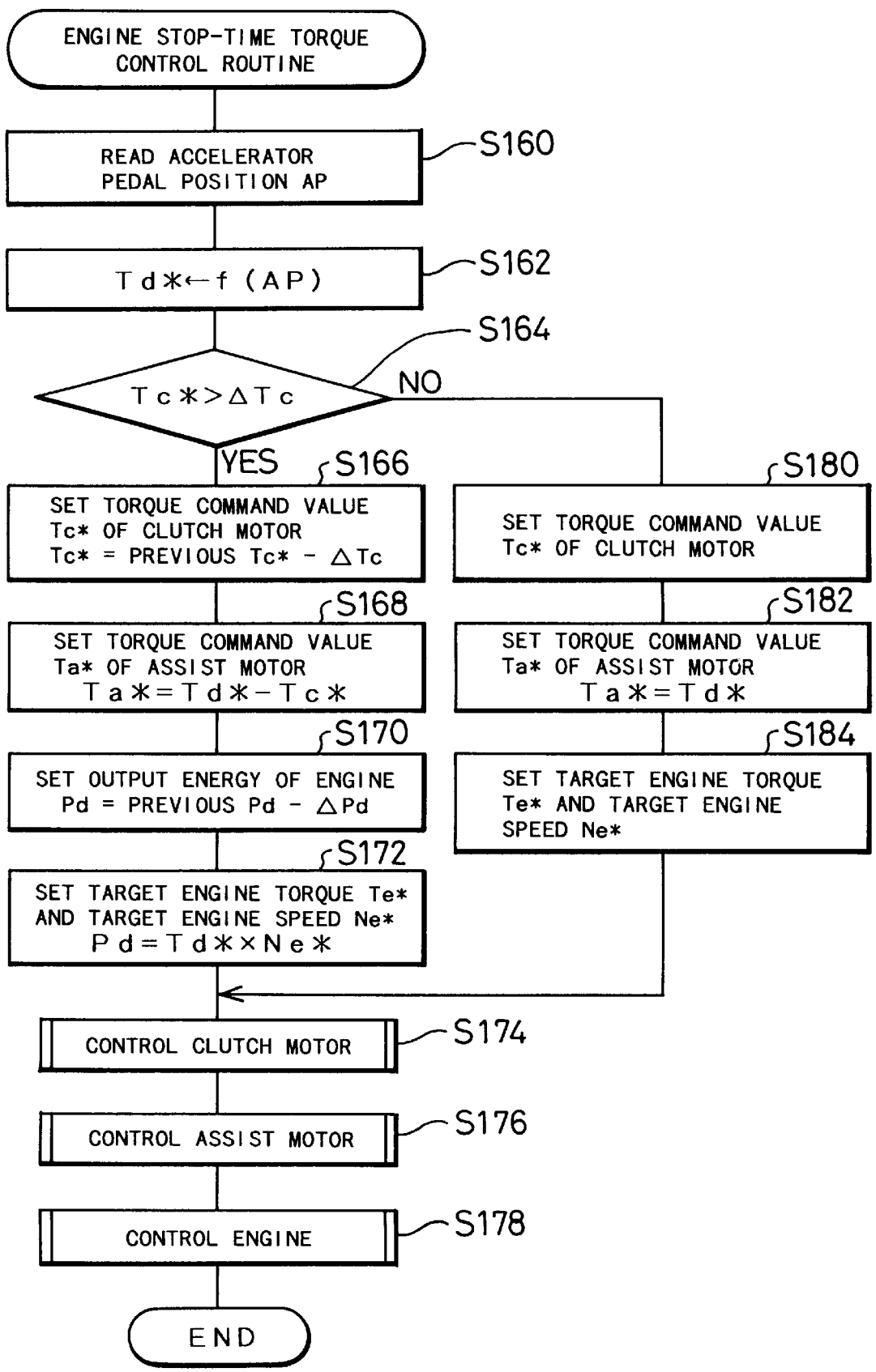
FIG. 9 is a flowchart showing an engine stop-time torque control routine executed by the controller 80.

Discharge control of the battery 94 is implemented, for example, by terminating the operation of the engine 50 and allowing the vehicle to be driven only by the power from the battery 94. Driving the vehicle with the power discharged from the battery 94 under the non-driving condition of the engine 50 starts when the residual capacity BRM of the battery 94 becomes equal to or greater than the discharge-initiating value BH, which has been set as a value requiring the discharging process, or when the driver gives a clear instruction to start the discharging process. An engine stop-time torque control routine illustrated in the flowchart of FIG. 9 is executed to terminate operation of the engine 50 and drive the vehicle with the power stored in the battery 94. In place of the torque control routine of FIG. 5, the engine stop-time torque control routine of FIG. 9 is executed repeatedly at predetermined time intervals when the controller 80 receives a battery discharge signal representing that the residual capacity BRM of the battery 94 becomes equal to or greater than the discharge-initiating value BH or a clear instruction from the driver as a stop signal to stop operation of the engine 50.

When the program enters the engine stop-time torque control routine, the control CPU 90 first receives data of accelerator pedal position AP from the accelerator position sensor 65 at step S160 and computes an output torque command value Td* corresponding to the input accelerator pedal position AP at step S162. The torque command value Tc* of the clutch motor 30 is compared with a subtraction amount ΔTc at step S164. In order to gradually decrease the output energy Pd of the engine 50 to the non-loading state, the torque command value Tc* of the clutch motor 30 acting as the torque Te of the engine 50 is gradually decreased by subtraction amounts ΔTc. The subtraction amount ΔTc is determined depending upon the interval of executing this routine and the performance of the clutch motor 30 and the engine 50. When this routine is activated for the first time in response to the stop signal to stop operation of the engine 50, the torque command value Tc* of the clutch motor 30 is generally greater than the subtraction amount ΔTc since the clutch motor 30 transmits the torque Te of the engine 50 to the drive shaft 22.

When the torque command value Tc* of the clutch motor 30 is greater than the subtraction amount ΔTC, the program proceeds to step S166 at which the control CPU 90 subtracts the subtraction amount ΔTc from the torque command value Tc* set in the previous cycle of this routine to determine a new torque command value Tc* of the clutch motor 30 as expressed by Equation (7) given below:

$$\text{New Tc*} = \text{Previous Tc*} - \Delta \text{Tc} \tag{7}$$

At subsequent step S168, the control CPU 90 further calculates the torque command value Ta* of the assist motor 40 by subtracting the new torque command value Tc* from the output torque command value Td* as expressed by Equation (8) given below:

$$\text{Ta*} = \text{Td*} - \text{Tc*} \tag{8}$$

The control CPU 90 computes a new output energy Pd of the engine 50 by subtracting a subtraction amount ΔPd from the output energy Pd set in the previous cycle of this routine at step S170. The output energy Pd of the engine 50 is decreased by the subtraction amount ΔPd every time when this routine is executed. The output energy Pd thus gradually decreases to the non-loading state. In this embodiment, in order to allow the target engine torque Te* and the target engine speed Ne* of the engine 50 to gradually approach the idling state, the subtraction amount ΔPd is set to be a little greater than the value calculated according to Equation (9) given below:

$$\Delta \text{Pd} = \Delta \text{Tc} \times \text{Ne} \tag{9}$$

At step S172, the control CPU 90 sets the target engine torque Te* and the target engine speed Ne* of the engine 50, based on the torque command value Tc* of the clutch motor 30 and the output energy Pd of the engine 50 respectively set at steps S166 and S170. The target engine torque Te* is set equal to the torque command value Tc* of the clutch motor 30 in order to effect stable rotation of the engine 50. The target engine speed Ne* is calculated according to Equation (10) given below:

$$\text{Pd} = \text{Te*} \times \text{Ne*} \tag{10}$$

As described previously, the subtraction amount ΔPd is set to be a little greater than the product of the subtraction amount ΔTc and the revolving speed Ne of the engine 50 in this embodiment. This means that the target engine speed Ne* is set to be a little smaller than the actual revolving speed Ne of the engine 50. Provided that the subtraction amount ΔTc is set equal to the value calculated by Equation (9), the target engine speed Ne* is equal to the actual revolving speed Ne of the engine 50. In this case, the revolving speed Ne of the engine 50 is unchanged while the target engine torque Te* is decreased.

After setting the torque command values Tc* and Ta* and the target engine torque Te* and the target engine speed Ne*, the control CPU 90 controls the clutch motor 30 (step S174), the assist motor 40 (step S176), and the engine 50 (step S178) to attain these values. The control of the clutch motor 30 executed at step S174 follows the clutch motor control routine shown in the flowchart of FIG. 6. The repeated execution of the engine stop-time torque control routine makes the target engine speed Ne* of the engine 50 equal to or less than the revolving speed Nd of the drive shaft 22. Under such conditions, the clutch motor 30 is controlled with the power stored in the battery 94 to attain the revolving speed (Nd-Ne) at the torque command value Tc*.

Figure 10:
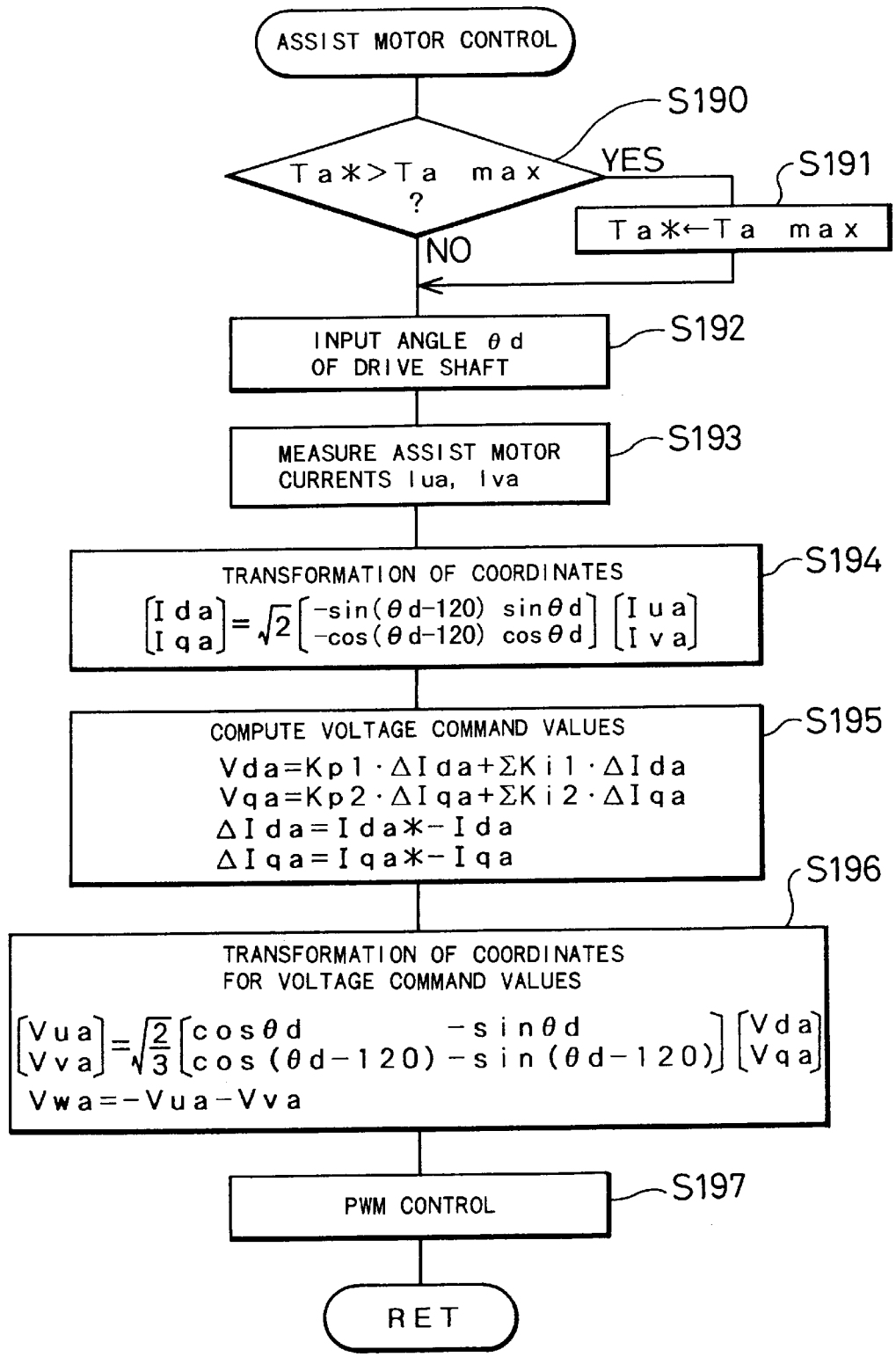
FIG. 10 is a flowchart showing essential steps of controlling the assist motor 40 executed by the controller 80 when the engine 50 stops operation.

The control of the assist motor 40 executed at step S176 follows an assist motor control routine shown in the flowchart of FIG. 10, instead of the assist motor control routine of FIGS. 7 and 8. The processing executed at steps S190 through S197 in the assist motor control routine of FIG. 10 is identical with the processing executed at steps S136 through S150 in the assist motor control routine of FIGS. 7 and 8. Since the torque command value Ta* of the assist motor 40 has been set in the engine stop-time torque control routine of FIG. 9, the processing for determining the torque command value Ta* in the assist motor control routine of FIGS. 7 and 8 is not required. Power regenerated by the clutch motor 30 is not sufficient for PWM (pulse width modulation) control of the assist motor 40 to give voltages corresponding to the preset torque command value Ta*. The deficiency is supplied by the power stored in the battery 94.

Irrespective of the output energy Pd of the engine 50, the torque output to the drive shaft 22 as a result of the torque control becomes equal to the output torque command value Td*, which is the sum of the torque command value Tc* of the clutch motor 30 and the torque command value Ta* of the assist motor 40. The output torque depends upon the accelerator pedal position AP. As long as the accelerator pedal position AP is kept unchanged, the repeated execution of this routine does not vary the torque output to the drive shaft 22.

As the engine stop-time torque control routine is repeatedly executed, the torque command value Tc* of the clutch motor 30 becomes equal to or less than the subtraction amount ΔTc at step S164. Under such conditions, the engine 50 is kept substantially at an idle and the vehicle is driven substantially only by the torque Ta of the assist motor 40. When the program recognizes this state, the control CPU 90 sets the torque command value Tc* of the clutch motor 30 equal to zero at step S180. The control CPU 90 further sets the torque command value Ta* of the assist motor 40 equal to the output torque command value Td* at step S182 and allocates the value '0' to both the target engine torque Te* and the target engine speed Ne* of the engine 50 at step S184. After the processing at steps S180 through S184, the program goes to steps S174 through S178 to control the clutch motor 30, the assist motor 40, and the engine 50 as described previously. The procedure of engine stop-time torque control completely releases the electromagnetic coupling of the drive shaft 22 with the crankshaft 56 via the clutch motor 30, stops operation of the engine 50, and enables the vehicle to be driven only by the torque Ta of the assist motor 40, which is generated by the power stored in the battery 94.

As discussed above, the power output apparatus 20 of the first embodiment can stop operation of the engine 50 without varying the output torque to the drive shaft 22. Namely the structure of the embodiment prevents the unexpected variation in torque output to the drive shaft 22 and ensures a good ride. The fixed output torque to the drive shaft 22 effectively prevents undesirable vibrations of the vehicle. The energy output from the engine 50 is used as the power in the process of stopping operation of the engine 50. This further enhances the energy efficiency.

In the power output apparatus 20 of the first embodiment, the engine stop-time torque control routine of FIG. 9 is repeatedly executed when the controller 80 receives a battery discharge signal representing that the residual capacity BRM of the battery 94 becomes equal to or greater than the discharge-initiating value BH or a clear instruction on from the driver as a stop signal to stop operation of the engine 50. Alternatively, the same routine may be executed repeatedly when the battery discharge signal or the clear instruction from the driver is input as an energy decrease signal representing that the output energy Pd of the engine 50 has decreased. In the latter case, at step S164 in the flowchart of FIG. 9, the torque command value Tc* of the clutch motor 30 is compared with the decreased target engine torque Te* of the engine 50, which is calculated from the decreased output energy Pd of the engine 50, instead of with the subtraction amount ΔTc. When the torque command value Tc* is greater than the decreased target engine torque Te*, the program executes the processing at steps S166 through S178. When the torque command value Tc* becomes equal to the decreased target engine torque Te*, on the other hand, the program executes only step S168 prior to the processing at steps S174 through S178. This structure can decrease the output energy Pd of the engine 50 without varying the output torque to the drive shaft 22.

In the structure of the power output apparatus 20 shown in FIG. 1, the clutch motor 30 and the assist motor 40 are separately attached to the different positions of the drive shaft 22. Like a modified power output apparatus 20A illustrated in FIG. 11, however, the clutch motor and the assist motor may integrally be joined with each other. A clutch motor 30A of the power output apparatus 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as a rotor of the assist motor 40A. Since the three-phase coils 36A are mounted on the inner rotor 34A connecting with the crankshaft 56, a rotary transformer 38A for supplying electric power to the three-phase coils 36A of the clutch motor 30A is attached to the crankshaft 56.

In the power output apparatus 20A, the voltage applied to the three-phase coils 36A on the inner rotor 34A is controlled against the inner-surface magnetic pole of the permanent magnets 35A set on the outer rotor 32A. This allows the clutch motor 30A to work in the same manner as the clutch motor 30 of the power output apparatus 20 shown in FIG. 1. The voltage applied to the three-phase coils 44 on the stator 43 is controlled against the outer-surface magnetic pole of the permanent magnets 35A set on the outer rotor 32A. This allows the assist motor 40A to work in the same manner as the assist motor 40 of the power output apparatus 20. The torque control routine of FIG. 5 and the engine stop-time torque control routine of FIG. 9 are also applicable to the power output apparatus 20A shown in FIG. 11, which accordingly implements the same operations and exerts the same effects as those of the power output apparatus 20 shown in FIG. 1.

As discussed above, the outer rotor 32A functions concurrently as one of the rotors in the clutch motor 30A and as the rotor of the assist motor 40A, thereby effectively reducing the size and weight of the whole power output apparatus 20A.

Figure 11:
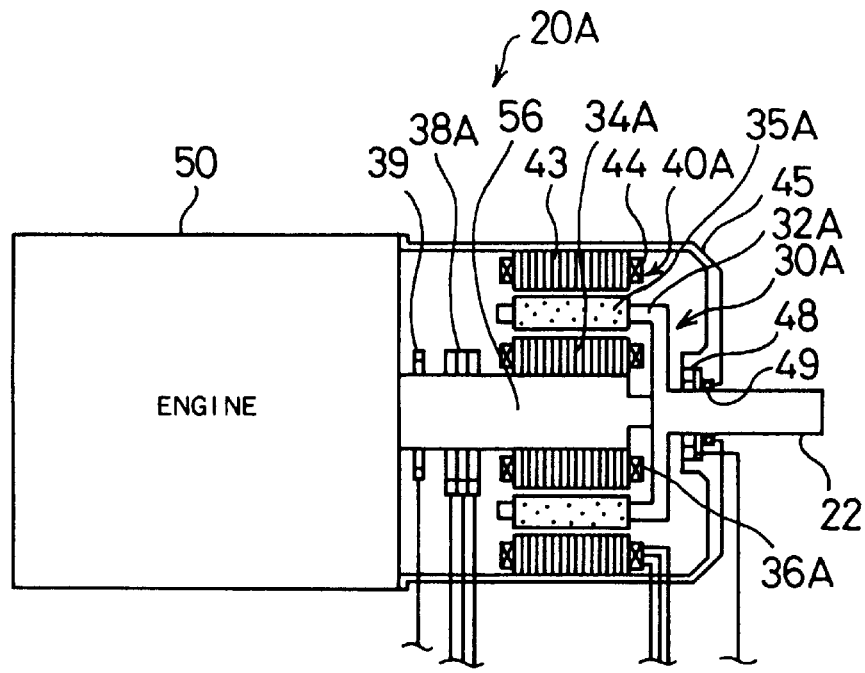
FIG. 11 schematically illustrates a power output apparatus 20A as a modification of the first embodiment.
Figure 12:
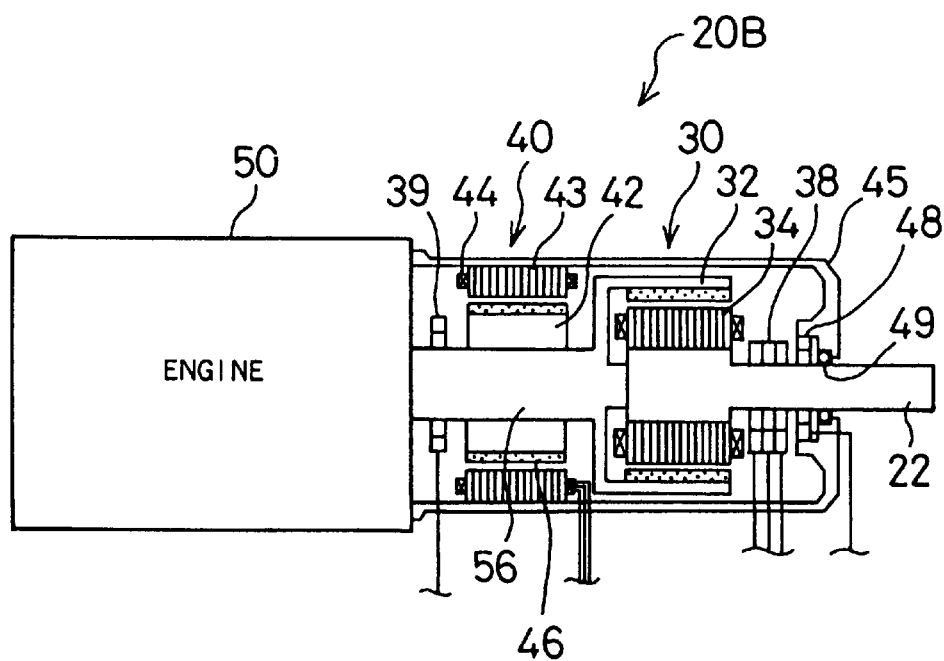
FIG. 12 schematically illustrates structure of another power output apparatus 20B as a second embodiment according to the present invention.

FIG. 12 schematically illustrates an essential part of another power output apparatus 20B as a second embodiment of the present invention. The power output apparatus 20B of FIG. 11 has a similar structure to that of the power output apparatus 20 of FIG. 1, except that the assist motor 40 is attached to the crankshaft 56 placed between the engine 50 and the clutch motor 30. In the power output apparatus 20B of the second embodiment, like numerals and symbols denote like elements as those of the power output apparatus 20 of FIG. 1. The symbols used in the description have like meanings unless otherwise specified.

The following describes the essential operation of the power output apparatus 20B shown in FIG. 12. By way of example, it is assumed that the engine 50 is driven with a torque Te and at a revolving speed Ne. When a torque Ta is added to the crankshaft 56 by the assist motor 40 linked with the crankshaft 56, the sum of the torques (Te+Ta) consequently acts on the crankshaft 56. When the clutch motor 30 is controlled to produce the torque Tc equal to the sum of the torques (Te+Ta), the torque Tc (=Te+Ta) is transmitted to the drive shaft 22.

When the revolving speed Ne of the engine 50 is greater than the revolving speed Nd of the drive shaft 22, the clutch motor 30 regenerates electric power based on the revolving speed difference Nc between the revolving speed Ne of the engine 50 and the revolving speed Nd of the drive shaft 22. The regenerated power is supplied to the assist motor 40 via the power lines P1 and P2 and the second driving circuit 92 to activate the assist motor 40. Provided that the torque Ta of the assist motor 40 is substantially equivalent to the electric power regenerated by the clutch motor 30, free torque conversion is allowed for the energy output from the engine 50 within a range holding the relationship of Equation (11) given below. Since the relationship of Equation (11) represents the ideal state with an efficiency of 100%, (Tc×Nd) is a little smaller than (Te×Ne) in the actual state.

$$Te \times Ne = Tc \times Nd \tag{11}$$

Referring to FIG. 4, under the condition that the crankshaft 56 rotates with the torque T1 and at the revolving speed N1, the energy corresponding to the sum of the regions G1+G3 is regenerated by the clutch motor 30 and supplied to the assist motor 40. The assist motor 40 converts the received energy in the sum of the regions G1+G3 to the energy corresponding to the sum of the regions G2+G3 and transmits the converted energy to the crankshaft 56.

When the revolving speed Ne of the engine 50 is smaller than the revolving speed Nd of the drive shaft 22, the clutch motor 30 works as a normal motor. In the clutch motor 30, the inner rotor 34 rotates relative to the outer rotor 32 in the direction of rotation of the drive shaft 22 at a revolving speed defined by the absolute value of the revolving speed difference Nc (=Ne-Nd). Provided that the torque Ta of the assist motor 40 is set to a negative value, which enables the assist motor 40 to regenerate electric power substantially equivalent to the electrical energy consumed by the clutch motor 30, free torque conversion is also allowed for the energy output from the engine 50 within the range holding the relationship of Equation (11) given above.

Referring to FIG. 4, under the condition that the crankshaft 56 rotates with the torque T2 and at the revolving speed N2, the energy corresponding to the region G2 is regenerated by the assist motor 40 and consumed by the clutch motor 30 as the energy corresponding to the region G1.

Figure 13:
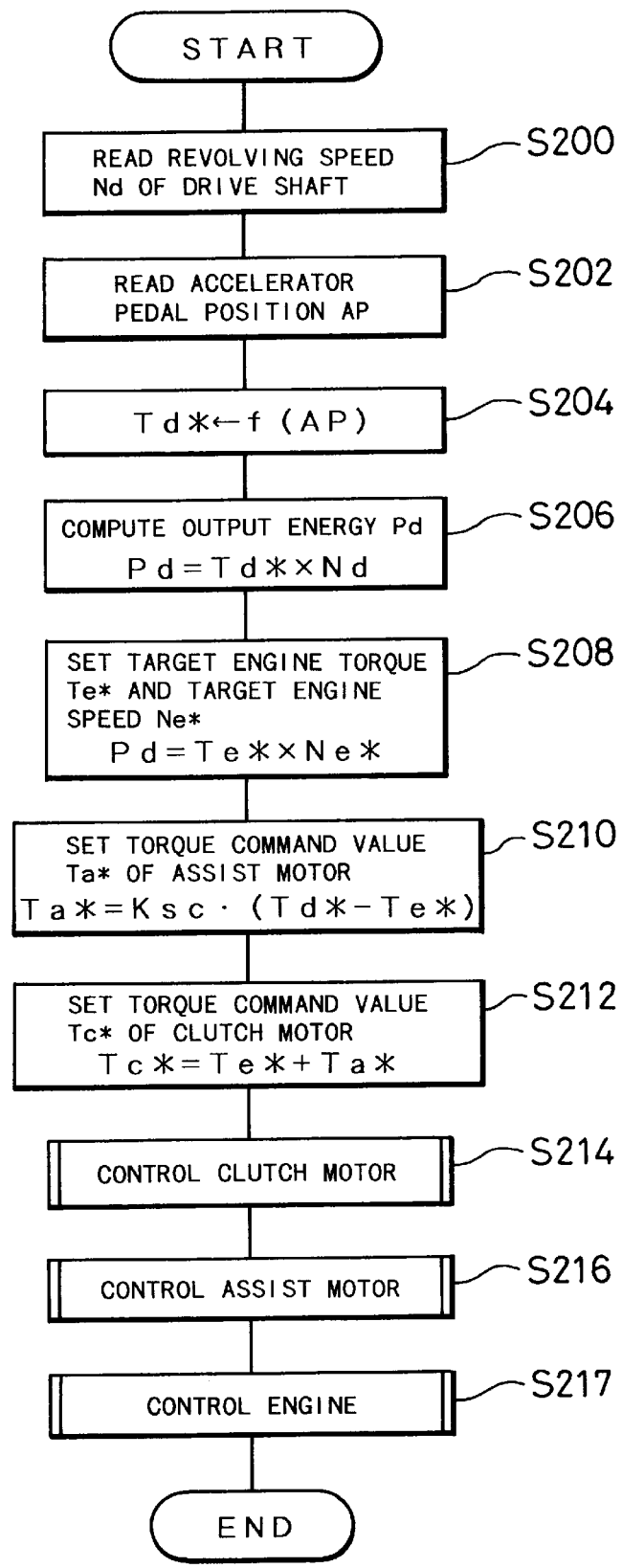
FIG. 13 is a flowchart showing a torque control routine executed by the controller 80 in the second embodiment.

The control procedure of the second embodiment discussed above follows the torque control routine shown in the flowchart of FIG. 13. When the program enters the torque control routine, the control CPU 90 of the controller 80 first executes the processing of steps S200 through S208, which is identical with that of steps S100 through S104 in the flowchart of FIG. 5. The control CPU 90 reads the revolving speed Nd of the drive shaft 22 at step S200 and the accelerator pedal position AP at step S202, and calculates the output torque command value Td* from the input accelerator pedal position AP at step S204. The control CPU 90 then computes the energy Pd to be output from the drive shaft 22 based on the calculated output torque command value Td* and the input revolving speed Nd of the drive shaft 22 at step S206, and sets the target engine torque Te* and the target engine speed Ne* of the engine 50 at step S208.

At subsequent step S210, the control CPU 90 computes the torque command value Ta* of the assist motor 40 according to Equation (12) given as:

$$Ta^* = Ksc \times (Td^* - Te^*) \tag{12}$$

At step S212, the torque command value Tc* of the clutch motor 30 is calculated from the torque command value Ta* of the assist motor 40 thus obtained according to Equation (13) expressed as:

$$Tc^* = Te^* + Ta^* \tag{13}$$

The control CPU 90 controls the clutch motor 30 at step S214, the assist motor 40 at step S216, and the engine 50 at step S217 based on the torque command values Ta* and Tc*, the target engine torque Te*, and the target engine speed Ne* thus obtained. The concrete procedure of the clutch motor control (step S214) is identical with that described above according to the flowchart of FIG. 6, whereas the concrete procedure of the engine control (step S217) is identical with that of the first embodiment discussed above. The assist motor control executed at step S216 essentially follows the processing of steps S192 through S196 in the assist motor control routine of FIG. 10, except that the rotational angle θe of the crankshaft 56 of the engine 50 measured with the resolver 39 is processed in place of the rotational angle θd of the drive shaft 22. This modification is ascribed to the position of the assist motor 40, which is attached to the crankshaft 56.

Figure 14:
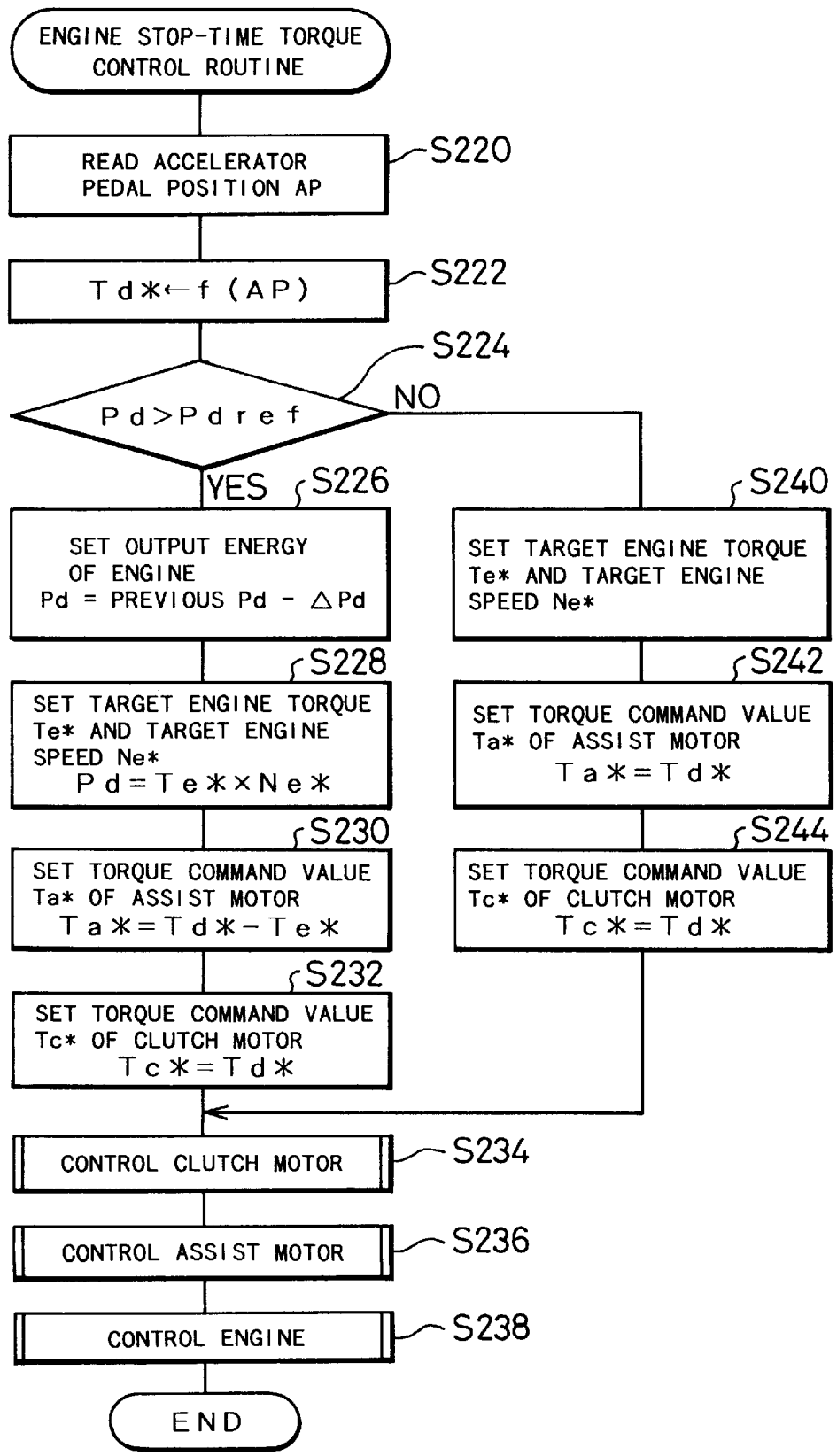
FIG. 14 is a flowchart showing an engine stop-time torque control routine executed by the controller 80 in the second embodiment.

The power output apparatus 20B of the second embodiment can effectively control charge and discharge of the battery 94. The vehicle may be driven only by the power stored in the battery 94 while operation of the engine 50 stops. The following describes the procedure of terminating operation of the engine 50 and driving the vehicle with the power discharged from the battery 94, based on an engine-stop time torque control routine of the second embodiment shown in the flowchart of FIG. 14. Like the similar routine of the first embodiment, the engine stop-time torque control routine of FIG. 14 is executed repeatedly at predetermined time intervals, in place of the torque control routine of FIG. 13, when the controller 80 receives a battery discharge signal representing that the residual capacity BRM of the battery 94 becomes equal to or greater than the discharge-initiating value BH or a clear instruction from the driver as a stop signal to stop operation of the engine 50.

When the program enters the engine stop-time torque control routine, the control CPU 90 first receives data of accelerator pedal position AP from the accelerator position sensor 65 at step S220 and computes the output torque command value Td* corresponding to the input accelerator pedal position AP at step S222. The output energy Pd of the engine 50 is compared with a threshold value Pdref at step S224. The threshold value Pdref is set to be a little greater than the output energy Pd of the engine 50 at an idle. When this routine is activated for the first time in response to the stop signal to stop operation of the engine 50, the output energy Pd is generally greater than the threshold value Pdref since the vehicle is driven by the power output from the engine 50.

When the output energy Pd is greater than the threshold value Pdref at step S224, the program proceeds to step S226 at which the control CPU 90 subtracts the subtraction amount ΔPd from the output energy Pd set in the previous cycle of this routine to determine a new output energy Pd. At subsequent step S228, the control CPU 90 sets a target engine torque Te* and a target engine speed Ne* of the engine 50 by considering the efficiency of the engine 50 and other conditions according to Equation (14) given below:

$$Pd = Te^* \times Ne^* \tag{14}$$

It is preferable that the target engine torque Te* and the target engine speed Ne* are set to gradually attain the idling state of the engine 50. The torque command value Ta* of the assist motor 40 is computed at step S230 according to Equation (15) given below:

$$Ta^* = Td^* - Te^* \tag{15}$$

whereas the torque command value Tc* of the clutch motor 30 is set equal to the output torque command value Td* at step S232.

The control CPU 90 executes control of the clutch motor 30 (step S234), control of the assist motor 40 (step S236), and control of the engine 50 (at step S238), which are identical with the processing executed at step S214 through S217 in the torque control routine of FIG. 13.

The repeated execution of this routine makes the target engine speed Ne* of the engine 50 equal to or less than the revolving speed Nd of the drive shaft 22. Under such conditions, the clutch motor 30 is controlled with the power stored in the battery 94 to attain the revolving speed (Nd−Ne) at the torque command value Tc*. Power regenerated by the clutch motor 30 is not sufficient for PWM control of the assist motor 40 to give voltages corresponding to the preset torque command value Ta*. The deficiency is supplied by the power stored in the battery 94.

Irrespective of the decrease in output energy Pd of the engine 50, the torque output to the drive shaft 22 as a result of the torque control becomes equal to the output torque command value Td*, which depends upon the accelerator pedal position AP. As long as the accelerator pedal position AP is kept unchanged, the repeated execution of this routine does not vary the torque output to the drive shaft 22.

As the engine stop-time torque control routine is repeatedly executed, the output energy Pd of the engine 50 becomes equal to or less than the threshold value Pdref at step S224. Under such conditions, the engine 50 is kept substantially at an idle. When the program recognizes this state, the control CPU 90 sets the target engine torque Te* and the target engine speed Ne* of the engine 50 equal to zero at step S240, sets the torque command value Ta* of the assist motor 40 equal to the output torque command value Td* at step S242, and sets the torque command value Tc* of the clutch motor 30 equal to the output torque command value Td* at step S244. This is followed by the control of the clutch motor 30 (step S234), the assist motor 40 (step S236), and the engine 50 (step S238). The procedure of engine stop-time torque control terminates operation of the engine 50 and enables the vehicle to be driven by the torque Tc of the clutch motor 30, which is generated by the power discharged from the battery 94. The assist motor 40 receives the reaction force of the torque command value Tc* output from the clutch motor 30 to the drive shaft 22. When the engine 50 stops operation, the revolving speed Ne of the engine 50 becomes equal to zero and a constant current, which can generate a torque against the torque command value Tc*, flows through the three-phase coils of the assist motor 40. The crankshaft 56 is accordingly electromagnetically-locked by the assist motor 40.

As discussed above, the power output apparatus 20B of the second embodiment can stop operation of the engine 50 without varying the output torque to the drive shaft 22. Namely the structure of the second embodiment prevents the unexpected variation in torque output to the drive shaft 22 and ensures a good ride. The fixed output torque to the drive shaft 22 effectively prevents undesirable vibrations of the vehicle.

In the power output apparatus 20B of the second embodiment, the engine stop-time torque control routine of FIG. 14 is repeatedly executed when the controller 80 receives a battery discharge signal representing that the residual capacity BRM of the battery 94 becomes equal to or greater than the discharge-initiating value BH or a clear instruction on from the driver as a stop signal to stop operation of the engine 50. Alternatively, the same routine may be executed repeatedly when the battery discharge signal or the clear instruction from the driver is input as an energy decrease signal representing that the output energy Pd of the engine 50 has decreased. In the latter case, at step S224 in the flowchart of FIG. 14, the output energy Pd of the engine 50 is compared with a target output energy Pd* of the engine 50, instead of with the threshold value Pdref. When the output energy Pd is greater than the target output energy Pd*, the program executes the processing at steps S226 through S238. When the output energy Pd becomes equal to the target output energy Pd*, on the other hand, the program executes steps S230 through S238. This structure can decrease the output energy Pd of the engine 50 without varying the output torque to the drive shaft 22.

Figure 15:
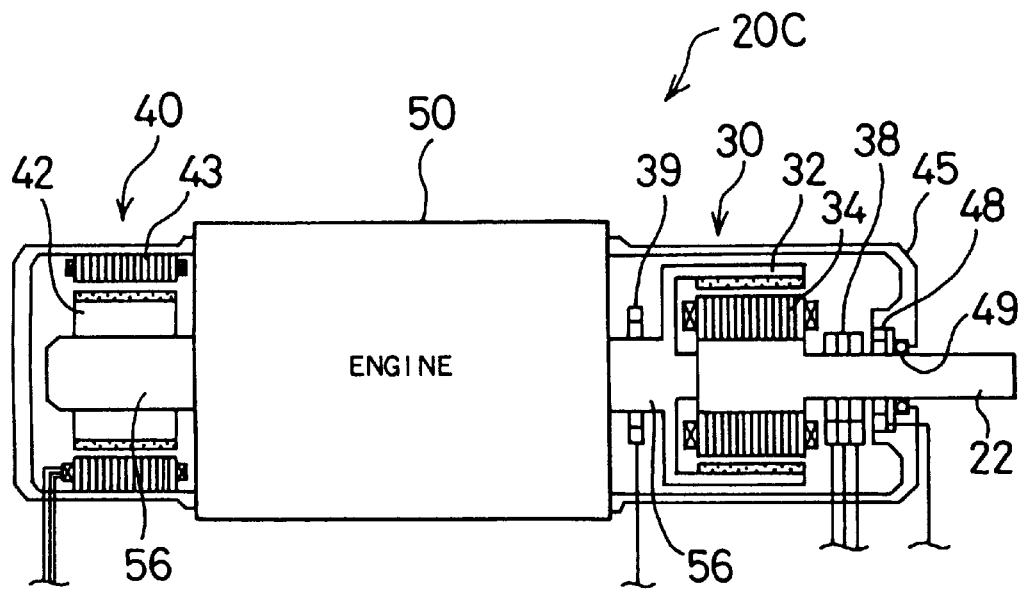
FIG. 15 schematically illustrates a power output apparatus 20C as a modification of the second embodiment.

In the power output apparatus 20B of FIG. 12 given as the second embodiment discussed above, the assist motor 40 is attached to the crankshaft 56 placed between the engine 50 and the clutch motor 30. Like another power output apparatus 20C illustrated in FIG. 15, however, the engine 50 may be interposed between the clutch motor 30 and the assist motor 40, both of which are linked with the crankshaft 56.

In the power output apparatus 20B of FIG. 12, the clutch motor 30 and the assist motor 40 are separately attached to the different positions of the crankshaft 56. Like a power output apparatus 20D shown in FIG. 16, however, the clutch motor and the assist motor may integrally be joined with each other. A clutch motor 30D of the power output apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. An assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power output apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30 of the power output apparatus 20B shown in FIG. 12. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40 of the power output apparatus 20B. The torque control routine of FIG. 13 and the engine stop-time torque control routine of FIG. 14 are also applicable to the power output apparatus 20D shown in FIG. 16, which accordingly implements the same operations and exerts the same effects as those of the power output apparatus 20B shown in FIG. 12.

Figure 16:
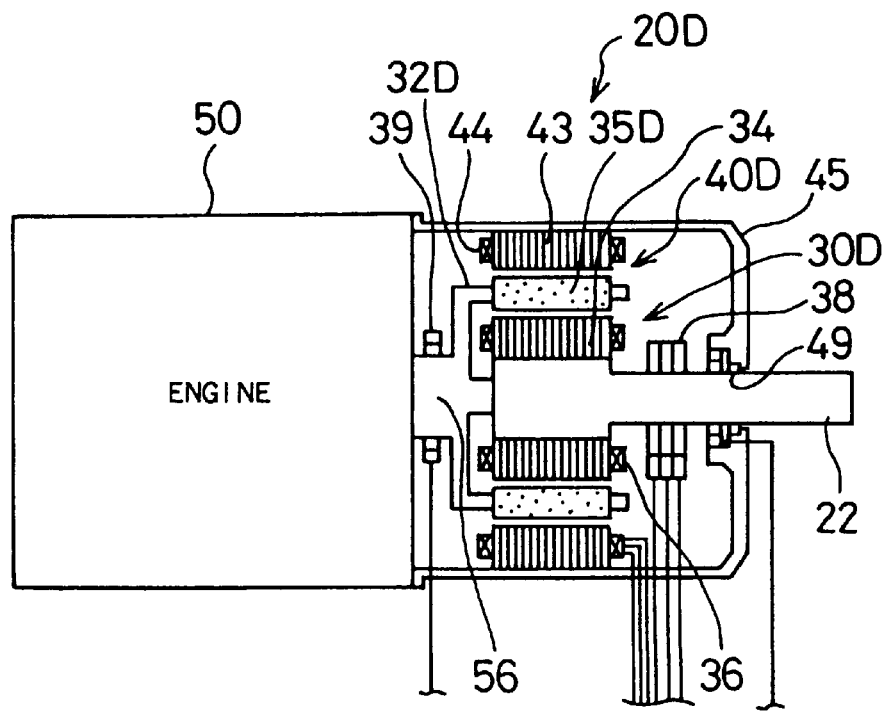
FIG. 16 schematically illustrates a power output apparatus 20D as another modification of the second embodiment.

Like the power output apparatus 20A shown in FIG. 11, in the power output apparatus 20D of FIG. 16, the outer rotor 32D functions concurrently as one of the rotors in the clutch motor 30D and as the rotor of the assist motor 40D, thereby effectively reducing the size and weight of the whole power output apparatus 20D.

There may be many other modifications, alternations, and changes without departing from the scope or spirit of essential characteristics of the invention. It is thus clearly understood that the above embodiments are only illustrative and not restrictive in any sense.

Figure 17:
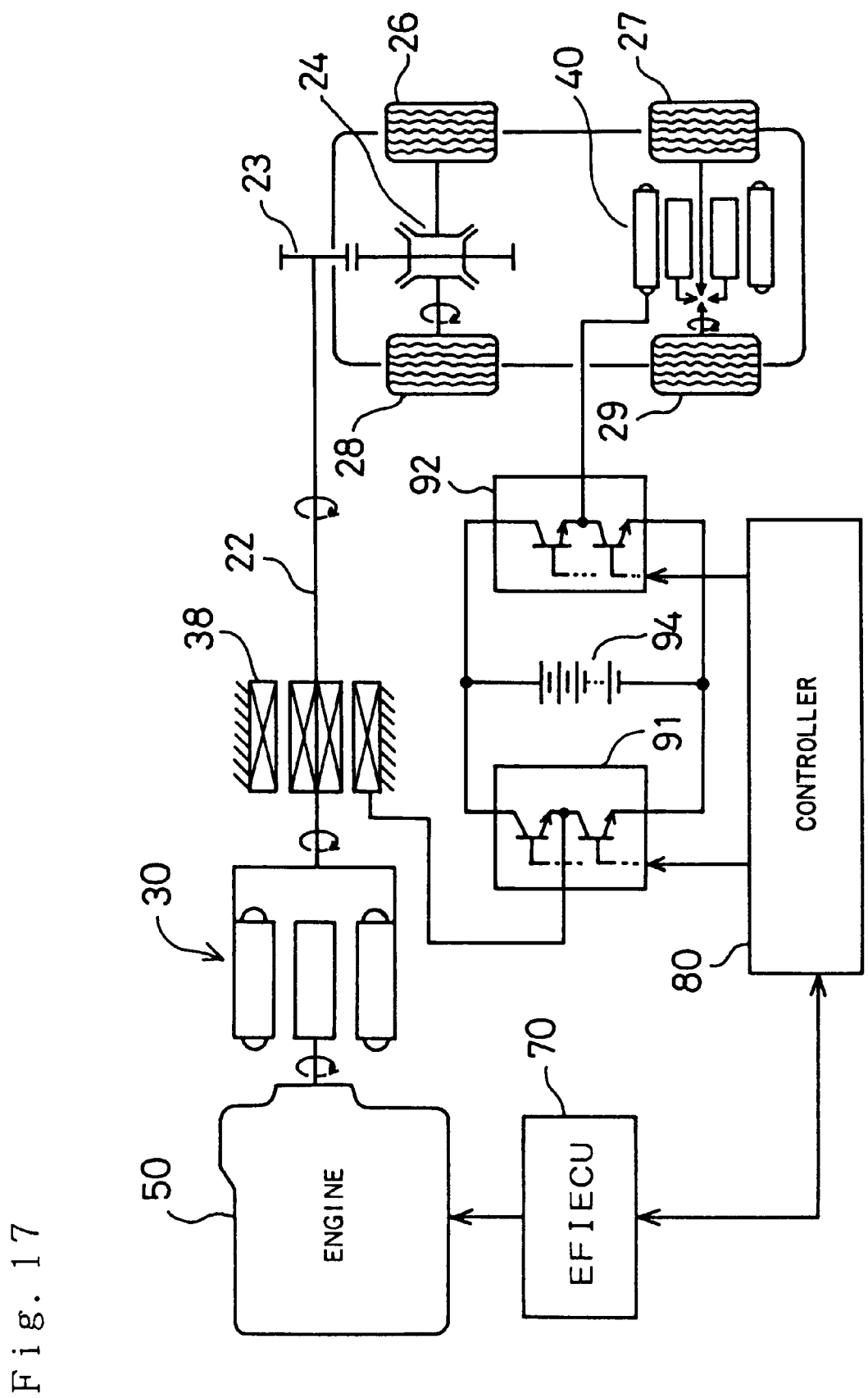
FIG. 17 shows structure in which the power output apparatus 20 of the first embodiment shown in FIG. 1 is applied to a vehicle with a four-wheel drive.

For example, the power output apparatus 20 of FIG. 1 is applicable to the vehicle with a four-wheel drive (4WD) as shown in FIG. 17. In the structure of FIG. 17, the assist motor 40, which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28. The control procedures of the first embodiment are also applicable to the structure of FIG. 17.

In this structure, the control procedure of increasing the torque Ta of the assist motor 40 with a decrease in torque Tc transmitted through the clutch motor 30 is implemented by decreasing the torque acting on the front driving wheels 26 and 28 while increasing the torque acting on the rear driving wheels 27 and 29. This results in control from the four-wheel drive to the two-wheel drive of the rear driving wheels 27 and 29.

The gasoline engine driven by means of gasoline is used as the engine 50 in the above power output apparatuses. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power output apparatuses described above. Other motors such as variable reluctance (VR)-type synchronous motors, vernier motors, d.c. motors, induction motors, superconducting motors, and stepping motors may be used for the regenerative operation and the power operation.

The rotary transformer 38 used as means for transmitting electric power to the clutch motor 30 may be replaced by a slip ring-brush contact, a slip ring-mercury contact, a semiconductor coupling of magnetic energy, or the like.

In the above power output apparatuses, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NIMH cells, Li cells, or the like cells. A capacitor may be used in place of the battery 94.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus comprising:

an output shaft for receiving power from an engine;

a drive shaft for transmitting power to a load;

an engine control device for controlling output of power from said engine;

a first motor comprising a first rotor connected with said output shaft and a second rotor connected with said drive shaft, said second rotor being coaxial to and rotatable relative to said first rotor to transmit power between said output shaft and said drive shaft via an electromagnetic connection of said first rotor and said second rotor;

a first motor-driving circuit that controls a degree of electromagnetic connection of said first rotor and said second rotor in said first motor and regulates rotation of said second rotor relative to said first rotor;

a second motor connected with said drive shaft;

a second motor-driving circuit that drives and controls said second motor;

a storage battery connected with said first motor-driving circuit and said second motor-driving circuit; and a controller that determines when a decrease in power output from said engine is desired and upon determination of said desired decrease in power output said controller sends signals to said first and second motor-driving circuits and to said engine control device for controlling output of power from said engine such that said first motor-driving circuit gradually decreases the degree of the electromagnetic connection of said first rotor with said second rotor in said first motor with a resultant decrease in power transmitted by said first motor, and said controller causes said engine control device to decrease the power output from said engine in relationship to the decrease in power transmitted by the first motor, and said second motor-driving circuit enables said second motor to use power stored in said storage battery to make up for the decrease in power transmitted by the first motor to maintain a substantially constant power transmitted by said drive shaft.

2. The power output apparatus in accordance with claim 1, wherein the desired decrease in power output from said engine is a stop in the operation of said engine and wherein said controller causes said engine control device to stop supply of fuel to said engine and sends signals to said first motor-driving circuit to release the electromagnetic connection of said first rotor with said second rotor in said first motor.

3. A power output apparatus comprising:

an output shaft for receiving power from an engine;

a drive shaft for transmitting power to a load;

an engine control device for controlling output of power from said engine;

a complex motor comprising a first rotor connected with said output shaft, a second rotor connected with said drive shaft being coaxial to and rotatable relative to said first rotor, and a stator for rotating said second rotor, said first rotor and said second rotor constituting a first motor, said second rotor and said stator constituting a second motor;

a first motor-driving circuit that drives and controls said first motor in said complex motor;

a second motor-driving circuit that drives and controls said second motor in said complex motor;

a storage battery connected with said first motor-driving circuit, and said second motor-driving circuit; and a controller that detects when a decrease in power output from said engine is desired, and in response to said desired decrease in power output said controller sends signals to said first and second motor-driving circuits and to said engine control device for controlling output of power from said engine such that said first motor-driving circuit gradually decreases the degree of electromagnetic connection of said first rotor with said second rotor in said first motor with a resultant decrease in power transmitted by said first motor and said engine control device decreases the power output from said engine in relationship to the decrease in power transmitted by said first motor and said controller causes said second motor-driving circuit to enable said second motor to use power stored in said storage battery to make up for the decrease in power transmitted by said first motor to maintain a substantially constant power transmitted to the drive shaft.

4. The power output apparatus in accordance with claim 3, wherein the desired decrease in power output from said engine detected by said controller is a stop in operation of said engine and said controller sends signals to said engine control device to stop supply of fuel to said engine while sending signals to said first motor-driving circuit to release the electromagnetic connection of said first rotor with said second rotor in said first motor.

5. A power output apparatus comprising:

an output shaft for receiving power from an engine;

a drive shaft for transmitting power to a load;

an engine control device for controlling power output from said engine;

a first motor comprising a first rotor connected with said output shaft and a second rotor connected with said drive shaft, said first motor being coaxial to and rotatable relative to said first rotor to transmit power between said output shaft and said drive shaft via an electromagnetic connection of said first rotor and said second rotor;

a first motor-driving circuit that controls a degree of electromagnetic connection of said first rotor and said second rotor in said first motor and regulates rotation of said second rotor relative to said first rotor;

a second motor connected with said output shaft;

a second motor-driving circuit that drives and controls said second motor;

a storage battery connected with said first motor-driving circuit and said second motor-driving circuit; and a controller that detects when a decrease in power output from said engine is desired, and when said desired decrease in power output is detected said controller sends signals to said engine control device to gradually decrease the power output from said engine while sending signals to said first and second motor-driving circuits such that said first and second motors use power stored in said storage battery to make up for the decrease in power output from said engine to maintain a substantially constant power transmitted to said drive shaft.

6. The power output apparatus in accordance with claim 5, wherein the signals sent by said controller to said first motor-driving circuit enable said first motor to make up for a decrease in revolving speed of the output shaft of said engine as said engine control device causes a reduction in the power output from said engine and the signals sent by said controller to said second motor-driving circuit enable said second motor to make up for a decrease in torque supplied to said output shaft while said engine control device is gradually reducing the power output from said engine.

7. A power output apparatus comprising:

an output shaft for receiving power from an engine;

a drive shaft for transmitting power to a load;

an engine control device for controlling power output from said engine;

a complex motor comprising a first rotor connected with said output shaft, a second rotor connected with said drive shaft being coaxial to and rotatable relative to said first rotor, and a stator for rotating said first rotor, said first rotor and said second rotor constituting a first motor, said first rotor and said stator constituting a second motor;

a first motor-driving circuit that drives and controls said first motor in said complex motor;

a second motor-driving circuit that drives and controls said second motor in said complex motor;

a storage battery connected with said first motor-driving circuit and said second motor-driving circuit; and a controller that detects when a decrease in power output from said engine is desired, and when said desired decrease in power output is detected said controller sends signals to said engine control device to gradually reduce the power output from said engine and said controller sends signals to said first and second motor-driving circuits to enable said first and second motors to use power stored in said storage battery to make up for the decrease in power output from said engine caused by said engine control device.

* * * * *